Figure 2A:
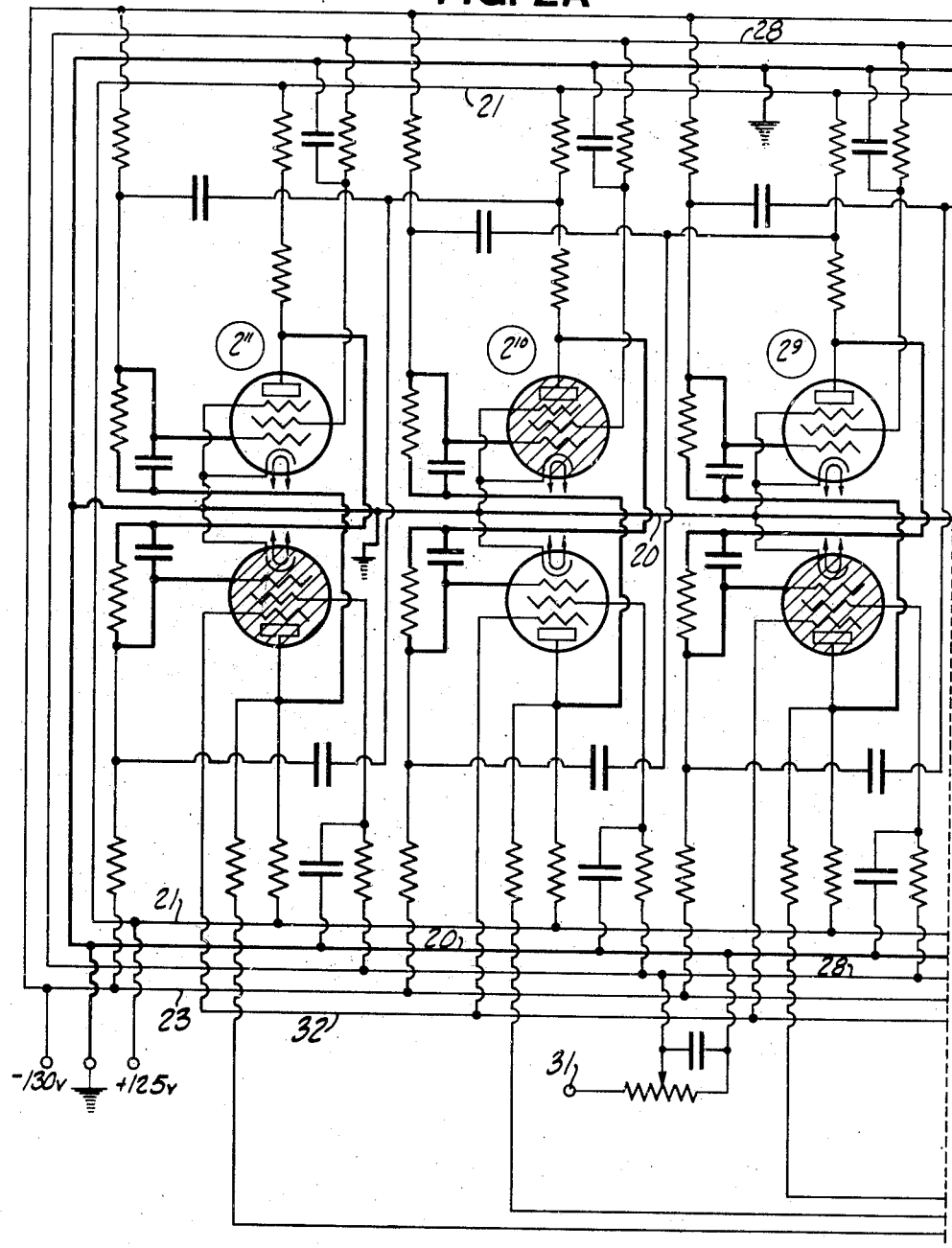

June 4, 1946.　　　J. R. DESCH ET AL　　　2,401,621
ELECTRONIC ACCUMULATORS
Filed Dec. 31, 1941　　　20 Sheets-Sheet 1
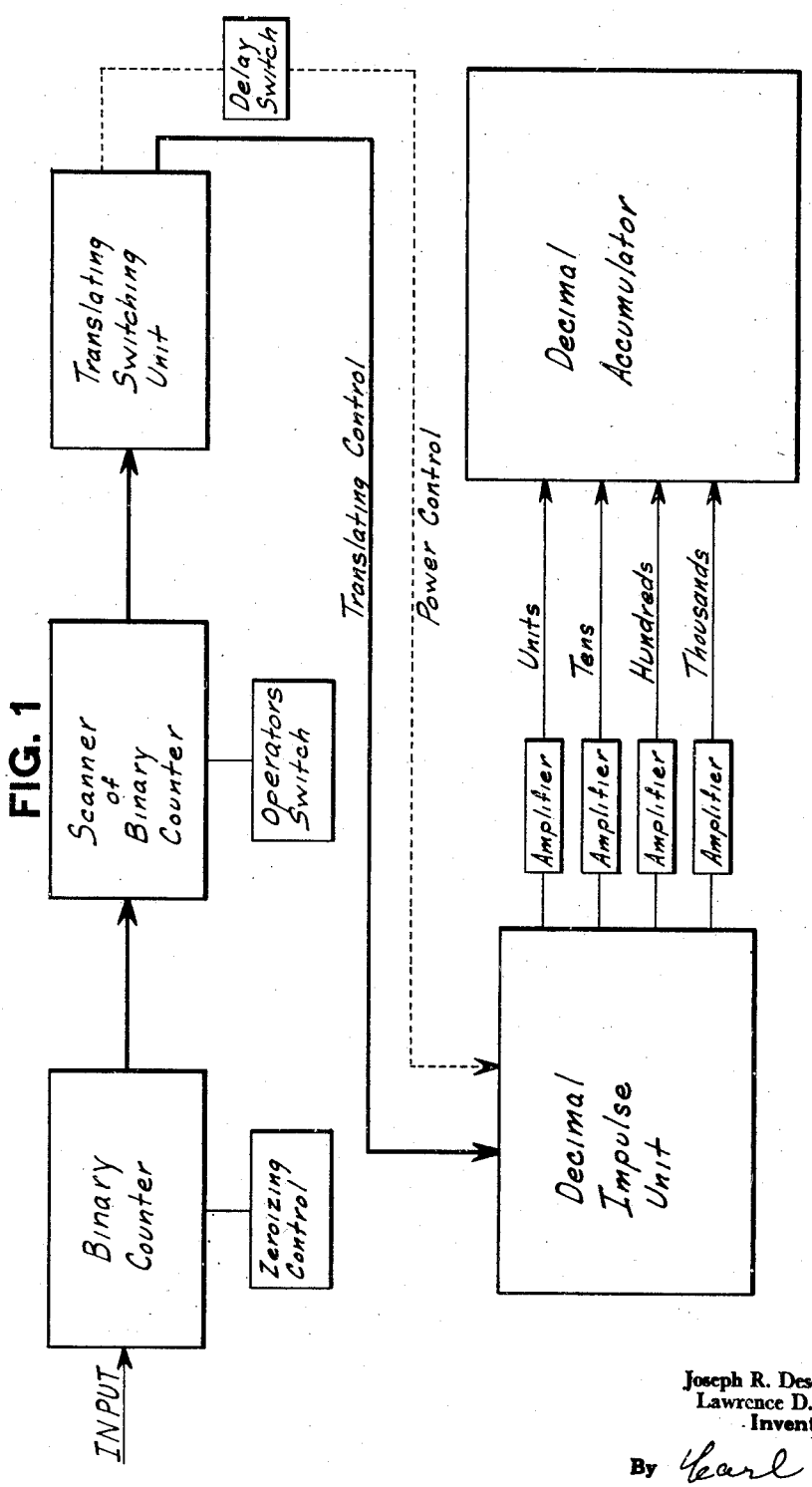
Joseph R. Desch and
Lawrence D. Kilheffer
Inventors
By *Earl Beust*
Their Attorney Joseph R. Desch and
Lawrence D. Kilheffer
Inventors June 4, 1946.　　　　J. R. DESCH ET AL　　　　2,401,621
ELECTRONIC ACCUMULATORS
Filed Dec. 31, 1941　　　20 Sheets-Sheet 4

Joseph R. Desch and
Lawrence D. Kilheffer
Inventors

By Carl Beust
Their Attorney

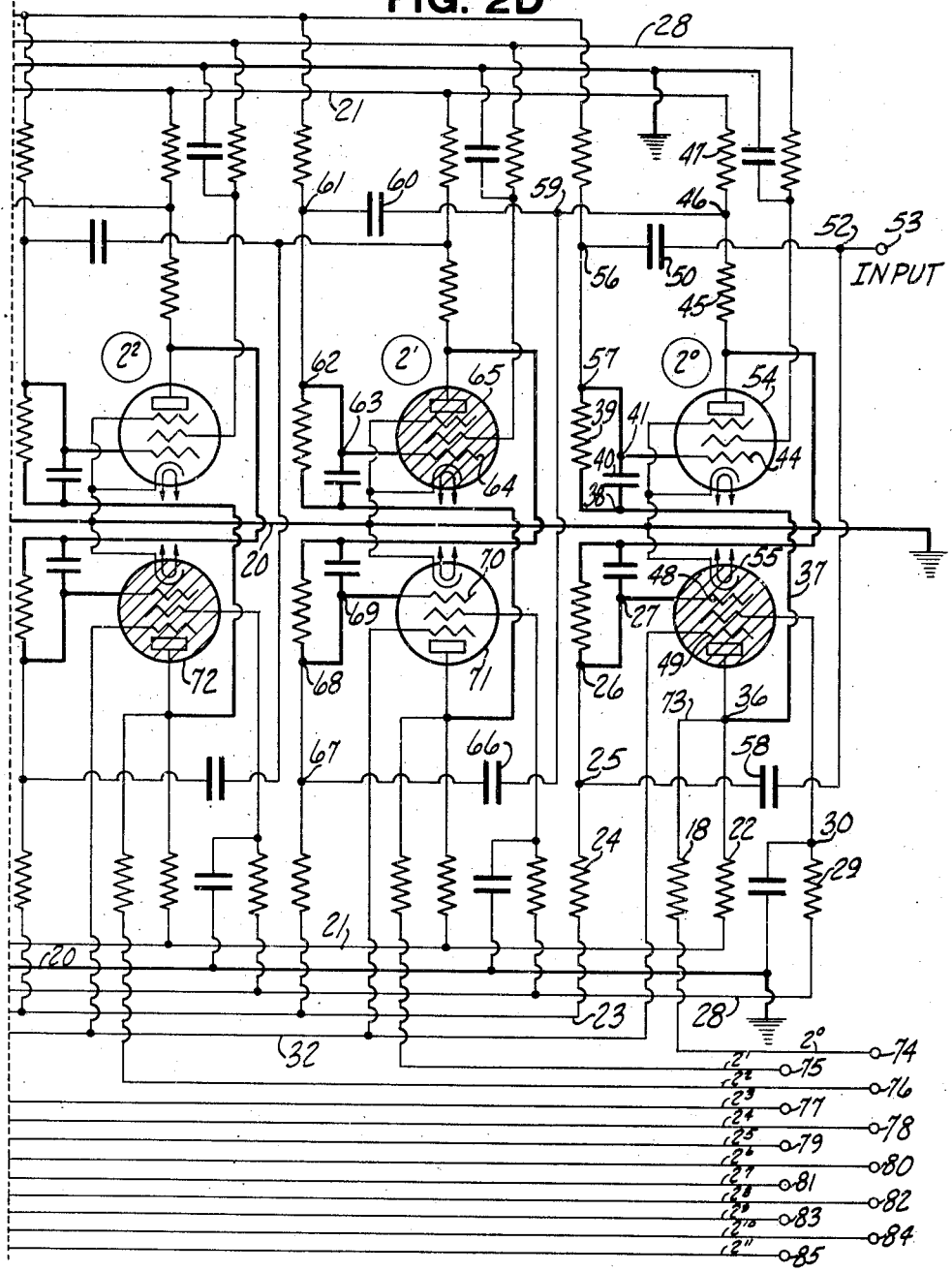

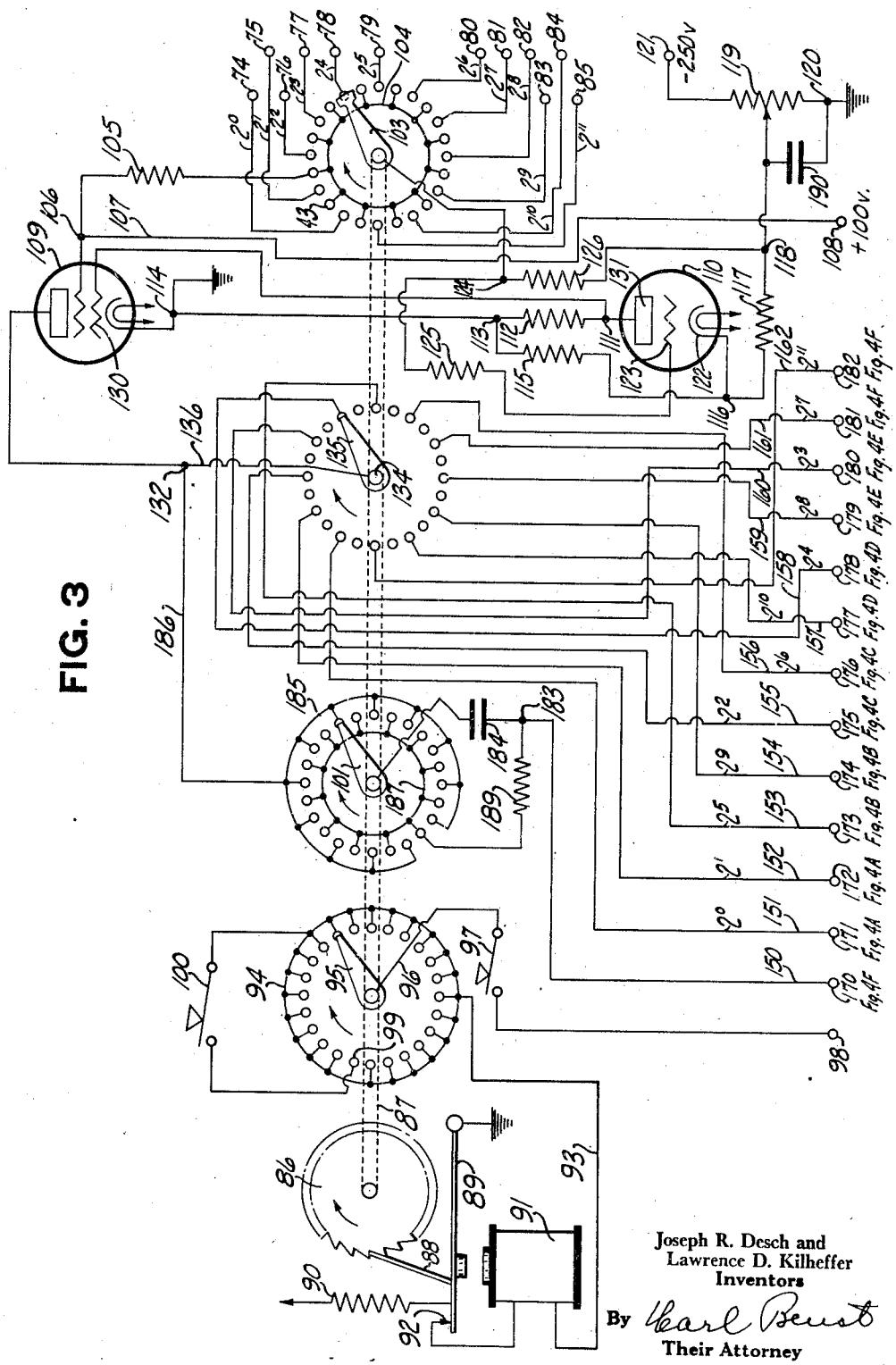

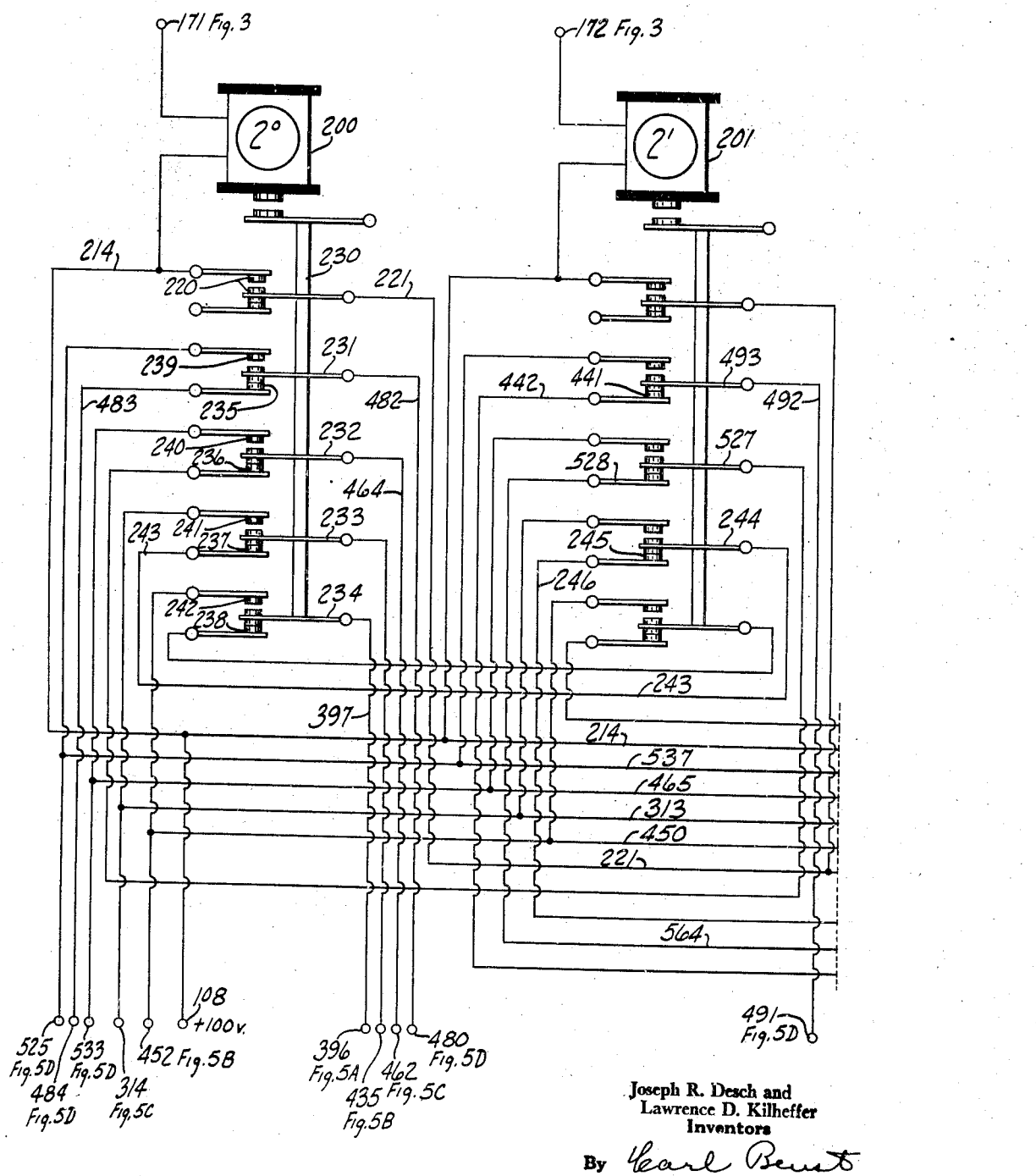

June 4, 1946.   J. R. DESCH ET AL   2,401,621
ELECTRONIC ACCUMULATORS
Filed Dec. 31, 1941   20 Sheets-Sheet 8

Joseph R. Desch and
Lawrence D. Kilheffer
Inventors

By Earl Benst
Their Attorney

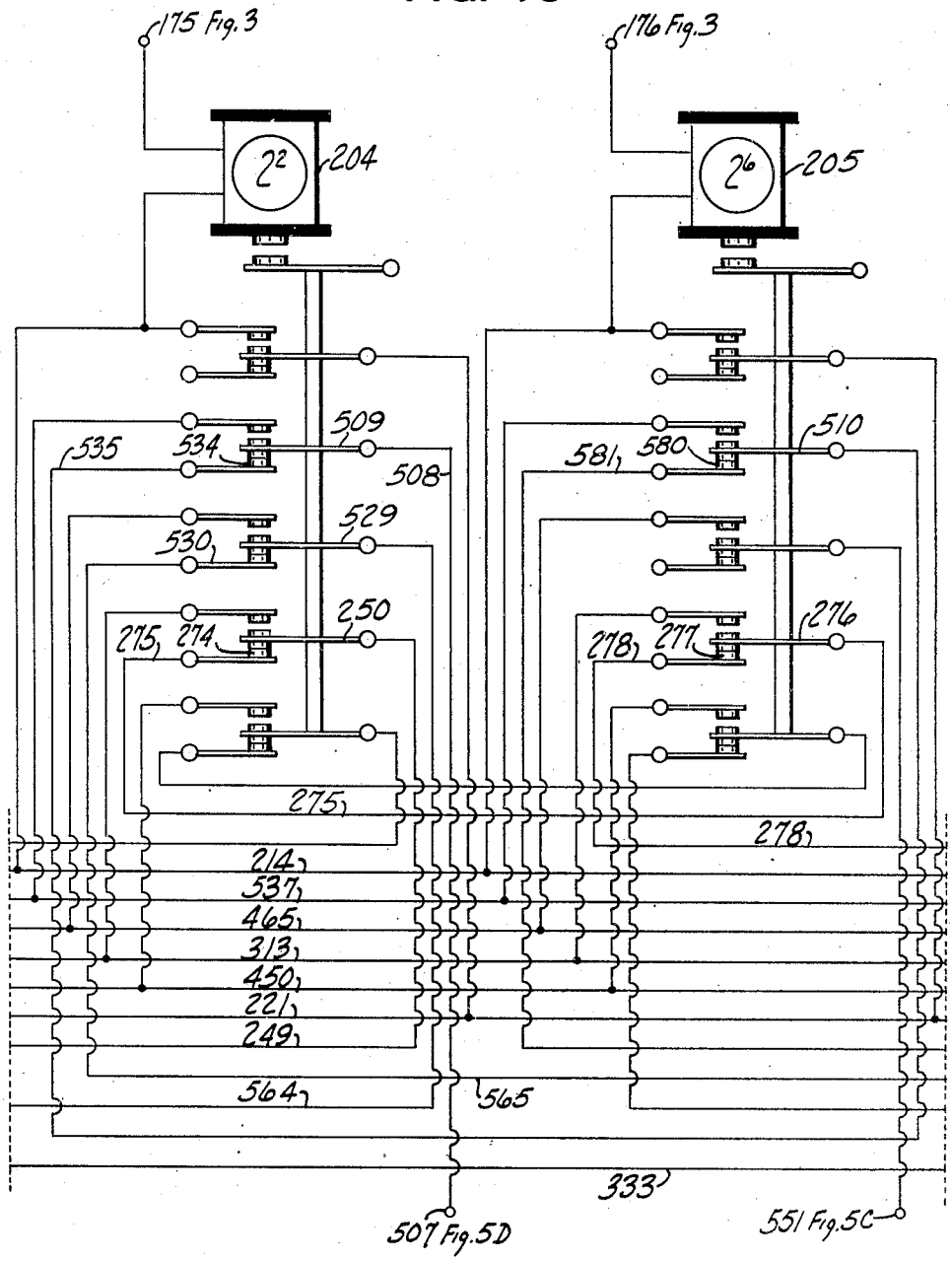

June 4, 1946.   J. R. DESCH ET AL   2,401,621
ELECTRONIC ACCUMULATORS
Filed Dec. 31, 1941    20 Sheets-Sheet 10

Joseph R. Desch and
Lawrence D. Kilheffer
Inventors

By *Hearl Beust*

Their Attorney

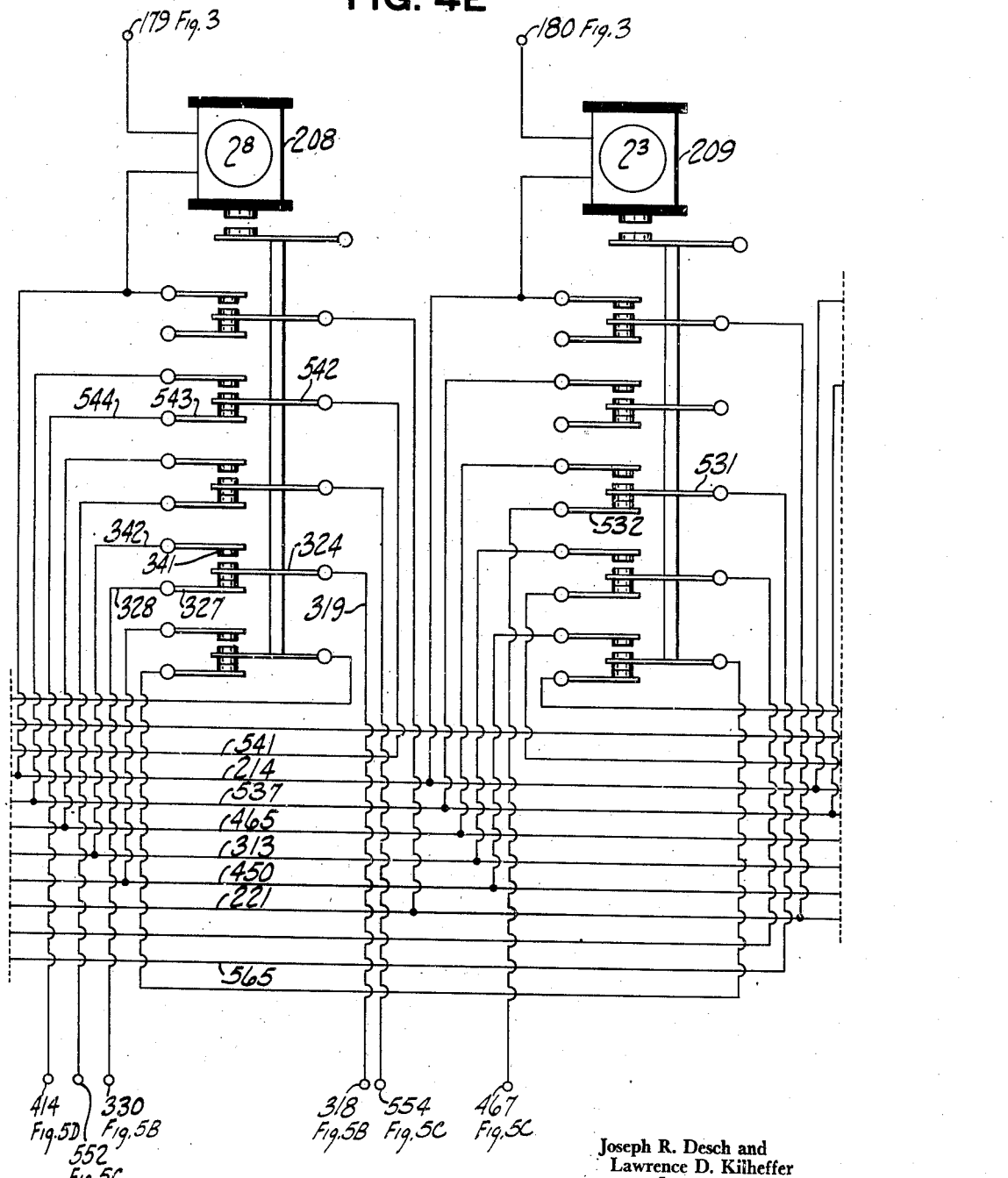

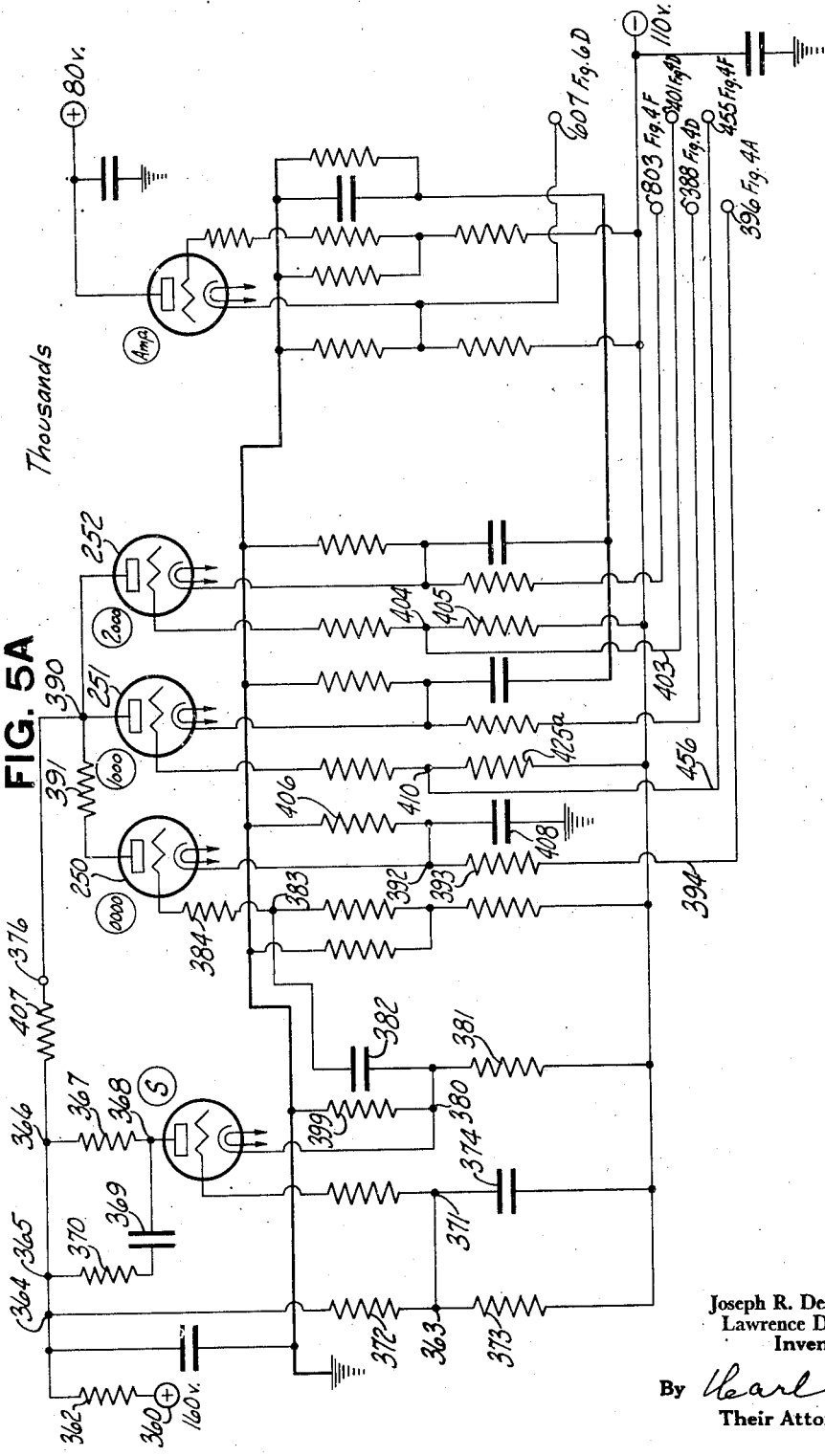

Joseph R. Desch and
Lawrence D. Kilheffer
Inventors

By Earl Beust
Their Attorney

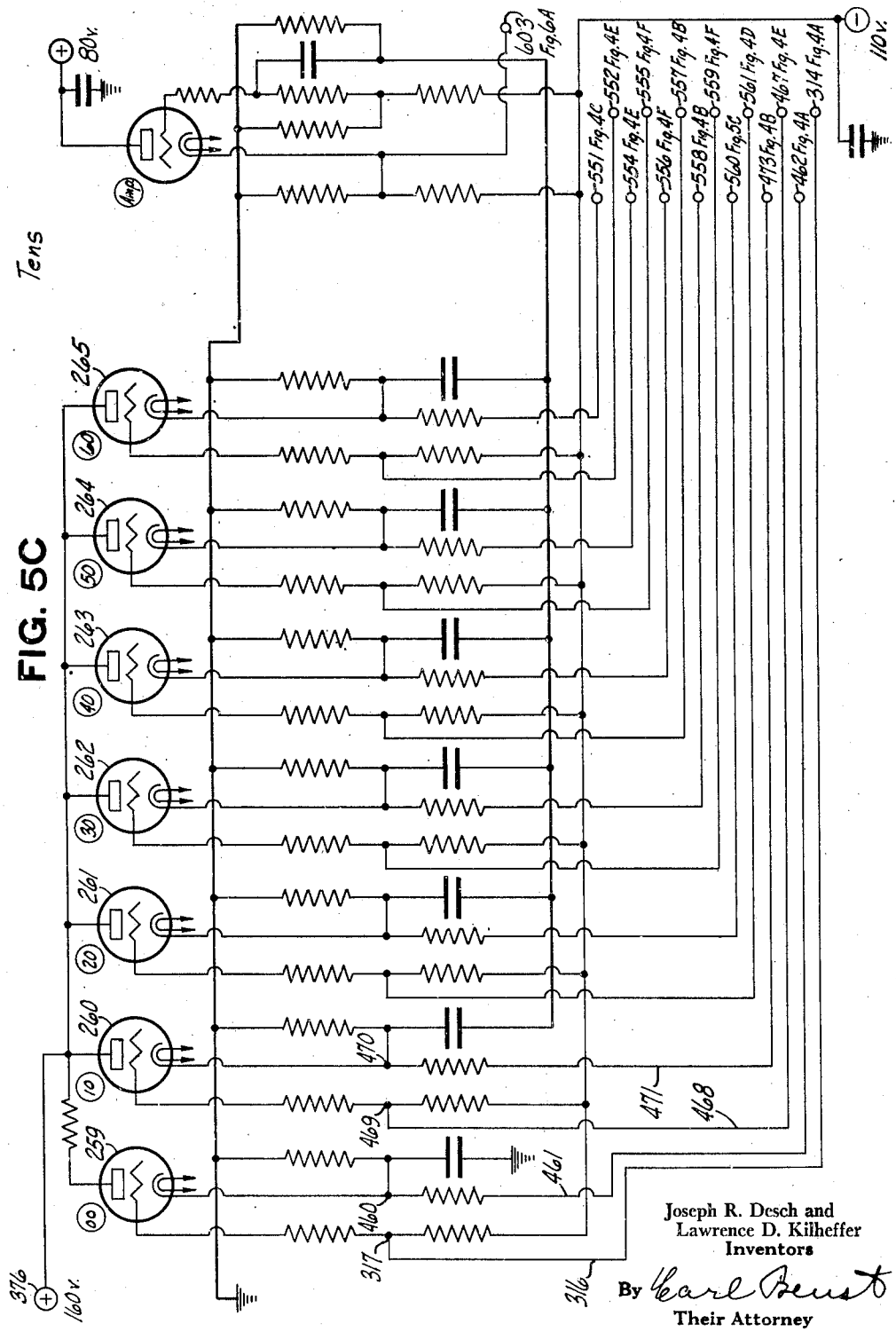

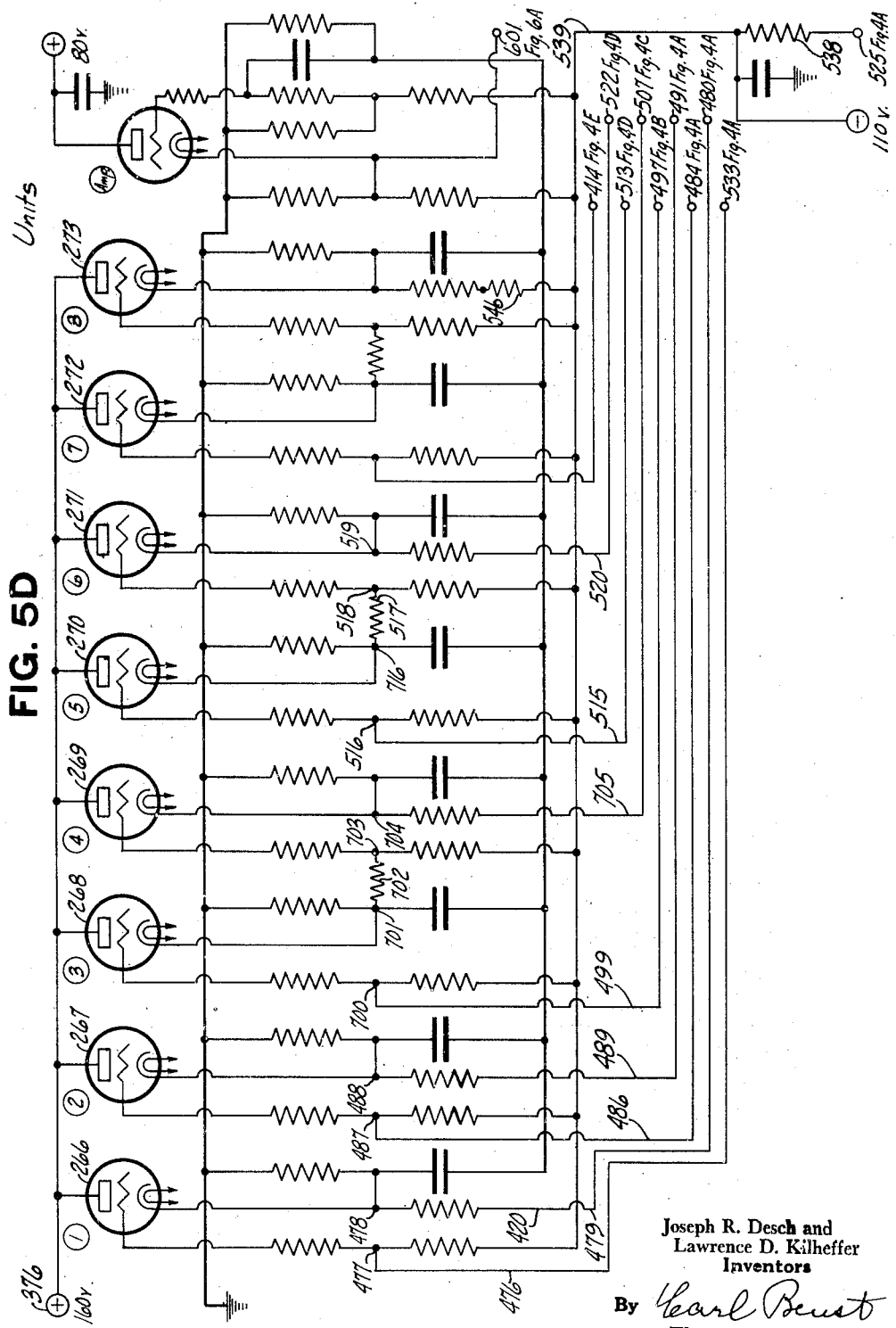

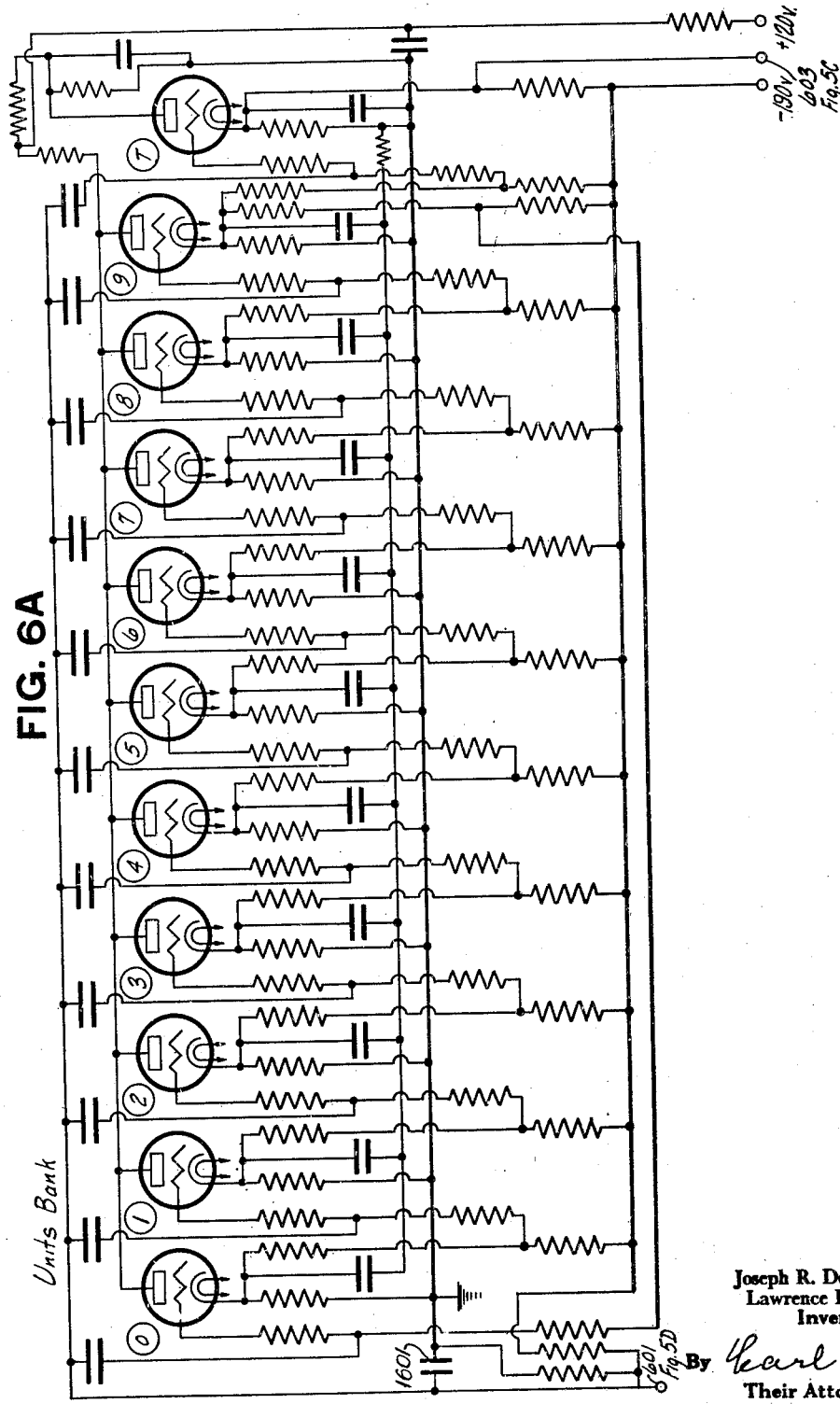

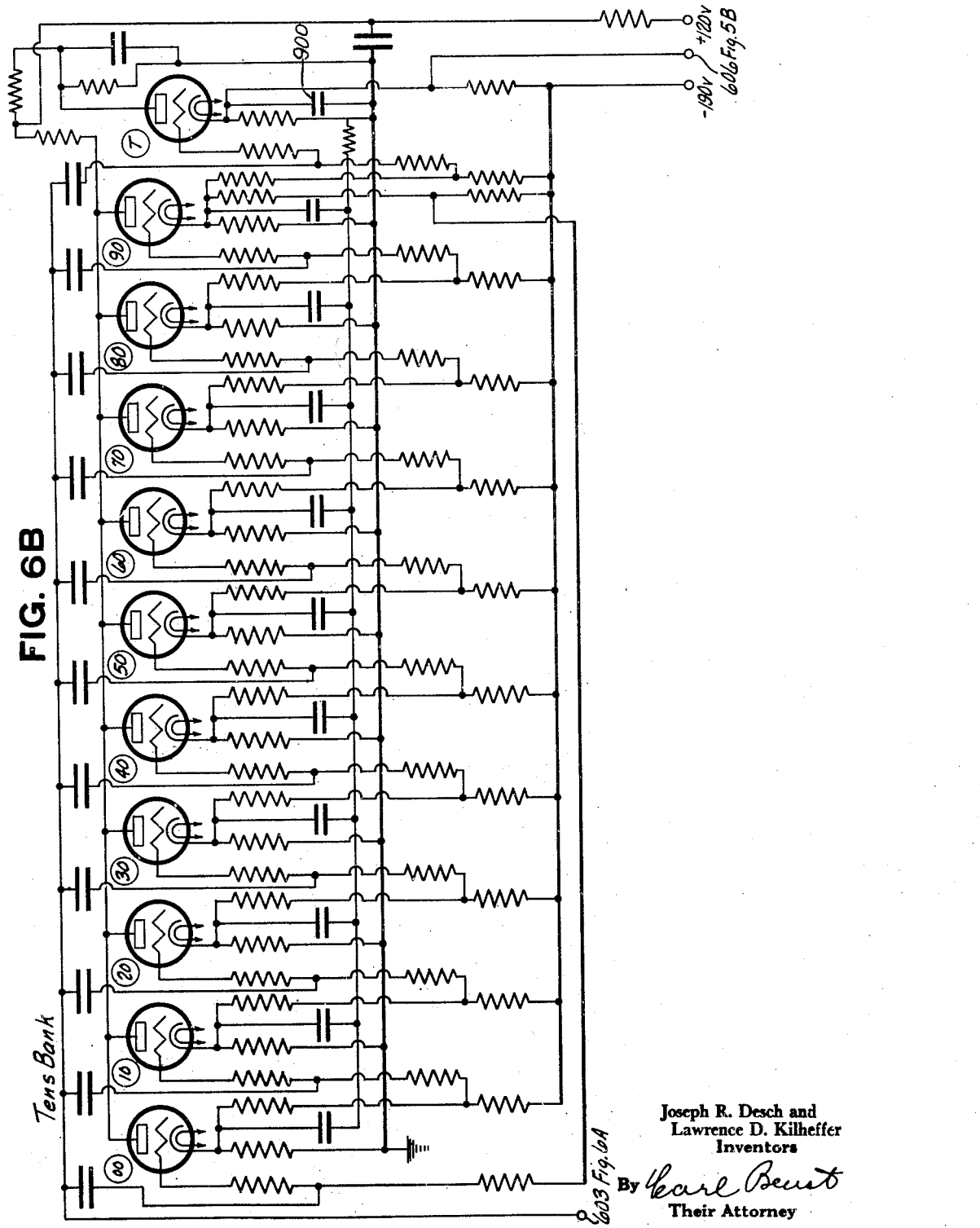

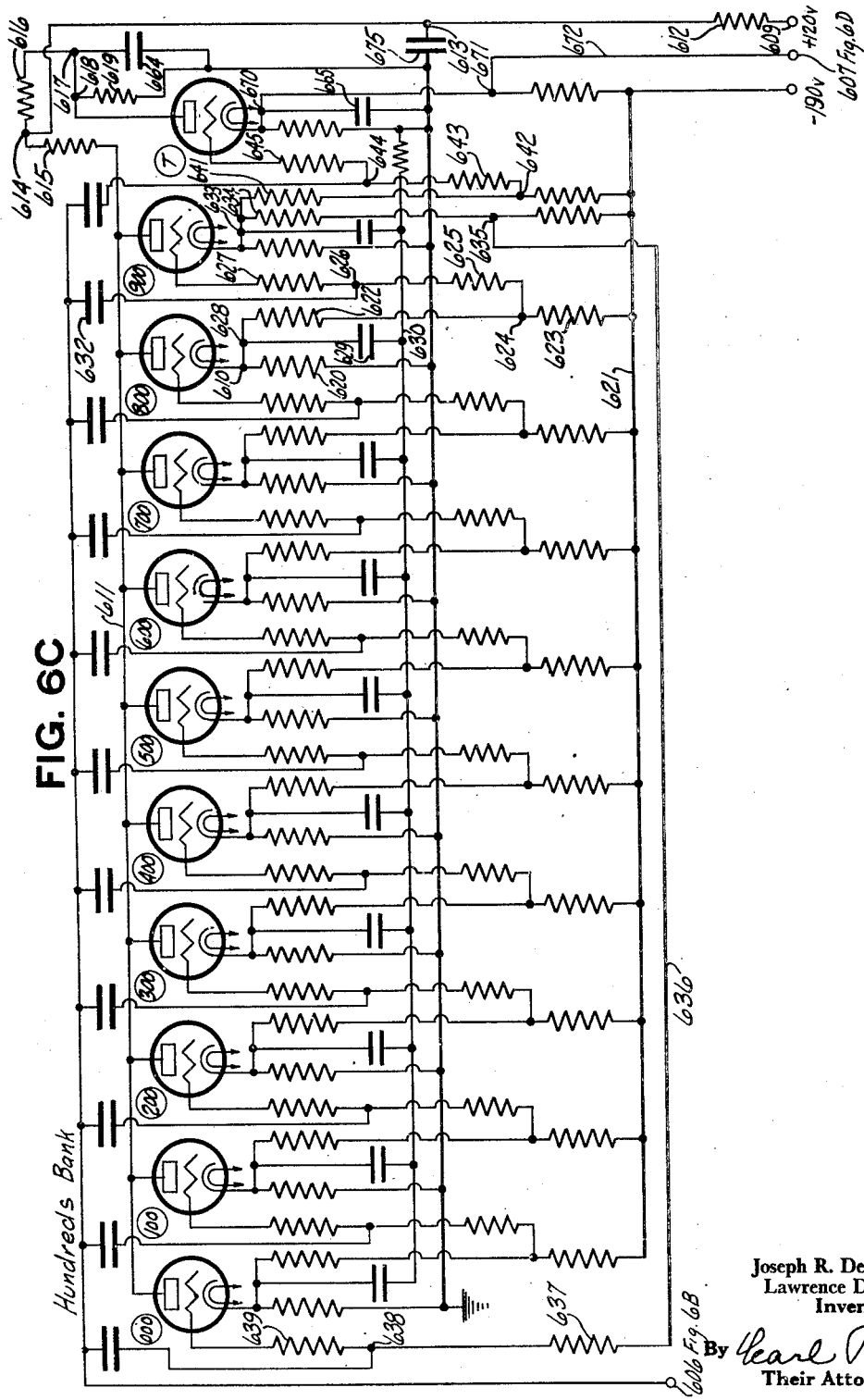

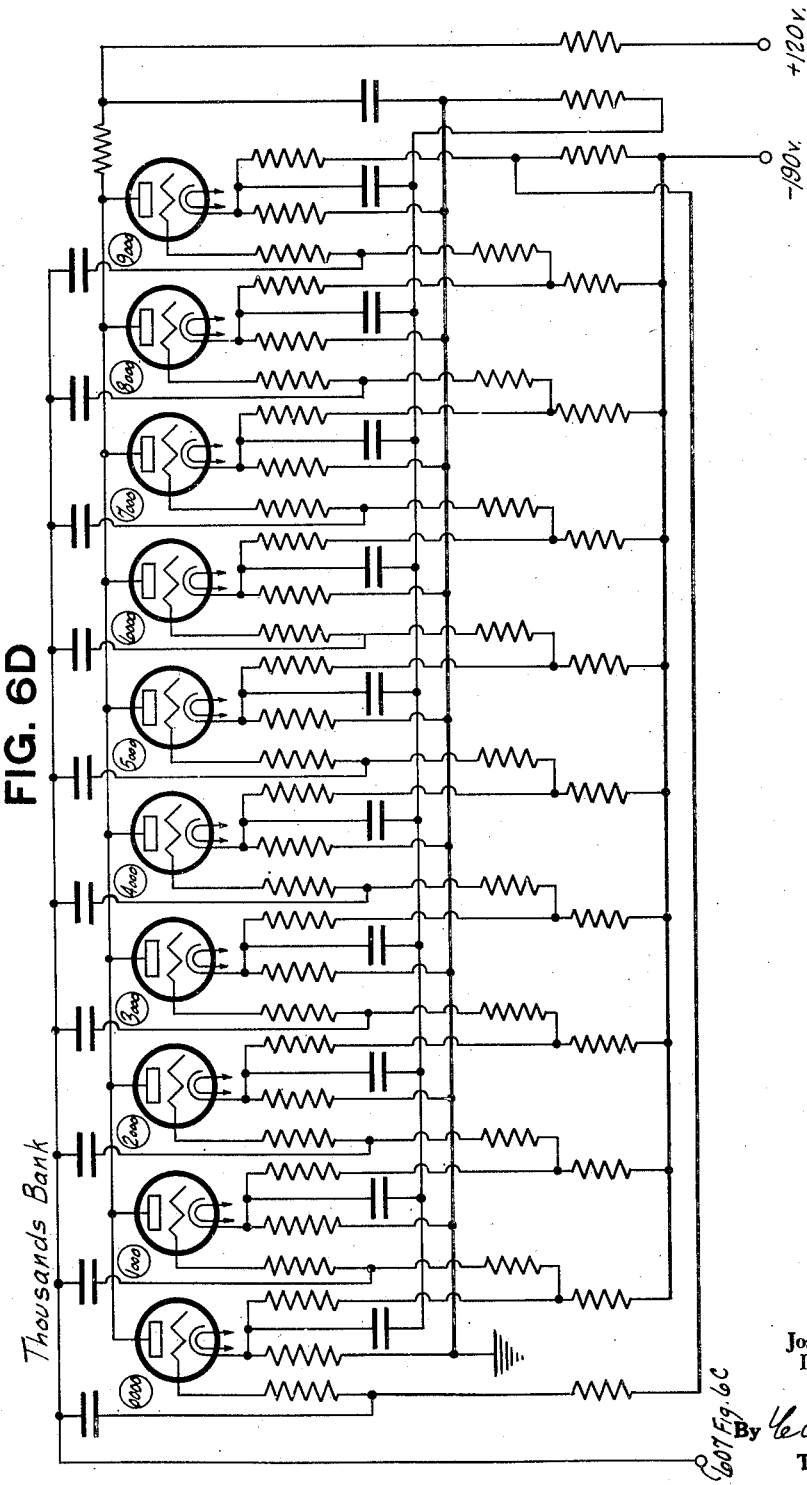

Patented June 4, 1946

2,401,621

UNITED STATES PATENT OFFICE 2,401,621

ELECTRONIC ACCUMULATOR

Joseph R. Desch and Lawrence D. Kilheffer, Dayton, Ohio, assignors to The National Cash Register Company, Dayton, Ohio, a corporation of Maryland Application December 31, 1941, Serial No. 425,112

9 Claims. (Cl. 235—61)

This invention relates to an electronic device for counting electric impulses in the binary system of numerical notation and translating the counted number of impulses into the decimal system of numerical notation.

In electronic counters of data represented by impulses, high-speed reception is desirable. It is well known that the response of two high-vacuum electron tubes coupled in a trigger circuit, so that when one tube is conducting the other tube is perforce non-conducting at any given instant, and so that their mode of operation as to which tube is conducting is changed by an electric impulse commonly impressed thereon, may be several million a second. By the use of the binary system of numerical notation, in which each denominational order is represented by two digits, commonly expressed as "0" and "1," one tube of a trigger pair may be arbitrarily designated as "0" and the other tube of the pair may be designated as "1," constituting a complete denominational order, the two tubes forming a two-element counting ring.

By the connection of such trigger-connected pairs of tubes together in a sequence whereby, upon two changes of the mode of operation of one pair, an impulse is impressed upon the next higher trigger pair of the sequence, causing a single change in the mode of operation of the next higher pair, a multi-denominational counter in the binary system of numerical notation is created. Such counters have heretofore been known.

Because of the difficulty in mentally interpreting the value of a number represented in the binary system of numerical notation, it is desirable to translate such a number into the decimal system of numerical notation, with which most persons are familiar. This invention provides a binary counter capable of receiving and counting individual electric impulses accurately at the rate of over a million a second, and provides electronic means for automatically translating the counted data into the decimal system of numerical notation in a very short time. For instance, a number accommodated by twelve denominational orders of the binary system may be translated into the decimal system of numerical notation and stored in a decimal denominational electronic accumulator in a fraction of a second.

The disclosed embodiment of the invention provides means for counting in one operation a group of impulses having not more than $2^{11}$ units, but the principle of the invention is not so limited, the system being indefinitely expansible. The decimal denominational accumulator likewise, as shown, has a limited capacity, but it too is capable of indefinite expansion.

Therefore, it is the principal object of this invention to provide an electronic receiver for counting electric impulses at high speed.

Another object of the invention is to provide an electronic counter of electric impulses, the data being received in a counter based on the binary system of numerical notation, which data is thereafter translated and entered into an accumulator of numerical data based on the decimal system of numerical notation.

Another object of the invention is to provide novel means for translating data from the binary system of numerical notation to the decimal system of numerical notation.

Another object of the invention is to provide means to create a number of electric impulses in each of a plurality of denominational orders of the decimal system of numerical notation that is the equivalent of data counted in the binary system of numerical notation.

Another object of the invention is to provide a storage means for counting electric impulses impressed thereon at intervals of the order of a millionth of a second in the binary system of numerical notation, which received data is thereafter automatically translated into the decimal system of numerical notation at the end of the reception.

Another object of the invention is to provide means to translate a number represented in a given denominational numerical notation into another denominational numerical notation.

With these and incidental objects in view, the invention includes certain novel features of construction, circuit designs, and combinations of parts, the essential elements of which are set forth in appended claims and a preferred form or embodiment of which is hereinafter described with reference to the drawings which accompany and form a part of this specification.

Of said drawings:

Fig. 1 is a diagrammatic functional representation of the invention.

Figs. 2A, 2B, 2C, and 2D are split views which together form a circuit diagram of the binary counter.

Fig. 3 shows the binary counter scanning system with connections to the binary-decimal translating unit.

Figs. 4A, 4B, 4C, 4D, 4E, and 4F are split views which together show the translating switches and connections to the decimal impulse unit.

Figs. 5A, 5B, 5C, and 5D are split views which together show the decimal impulse producing unit and the amplifiers therefor.

Figs. 6A, 6B, 6C, and 6D are split views which together show the decimal accumulator.

General description

In the disclosed embodiment of the invention, a binary counter having twelve denominational orders is provided, which will receive up to 4095 impulses at any one operation. The number "4095" is the number of such impulses represented in the decimal system of numerical notation. In the binary system of numerical notation, the lowest denominational order, $2^0$, can register zero or one unit; the next higher denominational order, $2^1$, can register zero or two units; the third denominational order, $2^2$, can register zero or four units; and the fourth denominational order, $2^3$, can register zero or eight units, the registering capacity of each denomination increasing by a power of two instead of, as in the decimal system, by a power of ten. In the above examples, the powers of two were translated into decimal numbers.

Thus, for example, the following table gives the binary equivalents of a few numbers denoted decimally:

| Decimal notation | | Binary notation | |
|---|---|---|---|
| 1 | = | 1 | $=2^0$ |
| 2 | = | 10 | $=2^1$ |
| 3 | = | 11 | $=2^1+2^0$ |
| 4 | = | 100 | $=2^2$ |
| 5 | = | 101 | $=2^2+2^0$ |
| 6 | = | 110 | $=2^2+2^1$ |
| 7 | = | 111 | $=2^2+2^1+2^0$ |
| 8 | = | 1000 | $=2^3$ |
| 9 | = | 1001 | $=2^3+2^0$ |
| 10 | = | 1010 | $=2^3+2^1$ |
| 11 | = | 1011 | $=2^3+2^1+2^0$ |

In translating the binary number 1011 to the decimal system, for instance, $2^3$ is added to $2^1$ and $2^0$, which is $8+2+1=11$.

It will thus be seen that the twelfth denominational order of the binary counter will represent $2^{11}$, or 2048 in the decimal system. The total registration capacity in a twelve-denominational order binary system counter is, as in other denominational systems of numerical notation, the sum of the maximum registration that can be made in each denominational order, and such maximum sum consists in this case, wherein twelve binary denominations are provided, of the sum of the following numbers, based on the decimal system: 1, 2, 4, 8, 16, 32, 64, 128, 256, 512, 1024, and 2048, which numbers added together give a grand total of 4095, which is, as has been stated, the decimal capacity of the binary counter shown.

It will be apparent that the digits of the units denominational order of the decimal system of numerical notation which it will be necessary to use to represent the first twelve denominations of the binary system decimally are 1, 2, 4, 6, and 8. The highest digit, therefore, in the units decimal order that is needed to represent a denomination of a binary number of a possible twelve denominations is 8; the highest decimal digit required in the tens decimal order is 6; the highest digit required in the hundreds decimal order is 5; and the highest digit required in the thousands decimal order is 2. Thus, in translating from the binary counter, denomination by denomination, to the decimal counter, the maximum number of unit entries in the decimal denominations for one denomination of the described binary counter will be as just stated; that is, any number up to 8 in the decimal units denomination; any number up to 6 in the decimal tens denomination; any number up to 5 in the decimal hundreds denomination; and any number up to 2 in the decimal thousands denomination. For embodiments of the invention which go beyond twelve denominational orders in the binary system, provision must be made to accommodate a higher number of input impulses into certain of the denominational orders of the decimal system. It is the purpose of the preceding discussion to explain why, in translating from the described binary counter, denomination by denomination, to the decimal counter, provision is made for entry of fewer than ten digits into some of the decimal orders.

Referring to Fig. 1, successive electric potential impulses are entered into the binary counter, which has beforehand been set to zero condition. After the selected number of impulses has been entered into the binary counter, not to exceed 4095, the operator then, by a control switch, causes a scanning device to sense the condition of the binary counter to determine into what denominations digits are entered. As the binary counter is scanned and denominational orders are found into which entry of data has been made, certain translating switching operations are initiated automatically, which cause differential control of the decimal impulse unit, which in turn automatically produces impulses corresponding to the denominational orders of the decimal system. These produced decimal denominational impulses then are entered into a decimal electronic impulse counter, which receives, or is capable of receiving, more than one translating operation and accumulating the sum of the data entered in the several operations. The decimal accumulator may have a capacity as great as desired, as will be shown later.

The binary counter

Figure 2B:
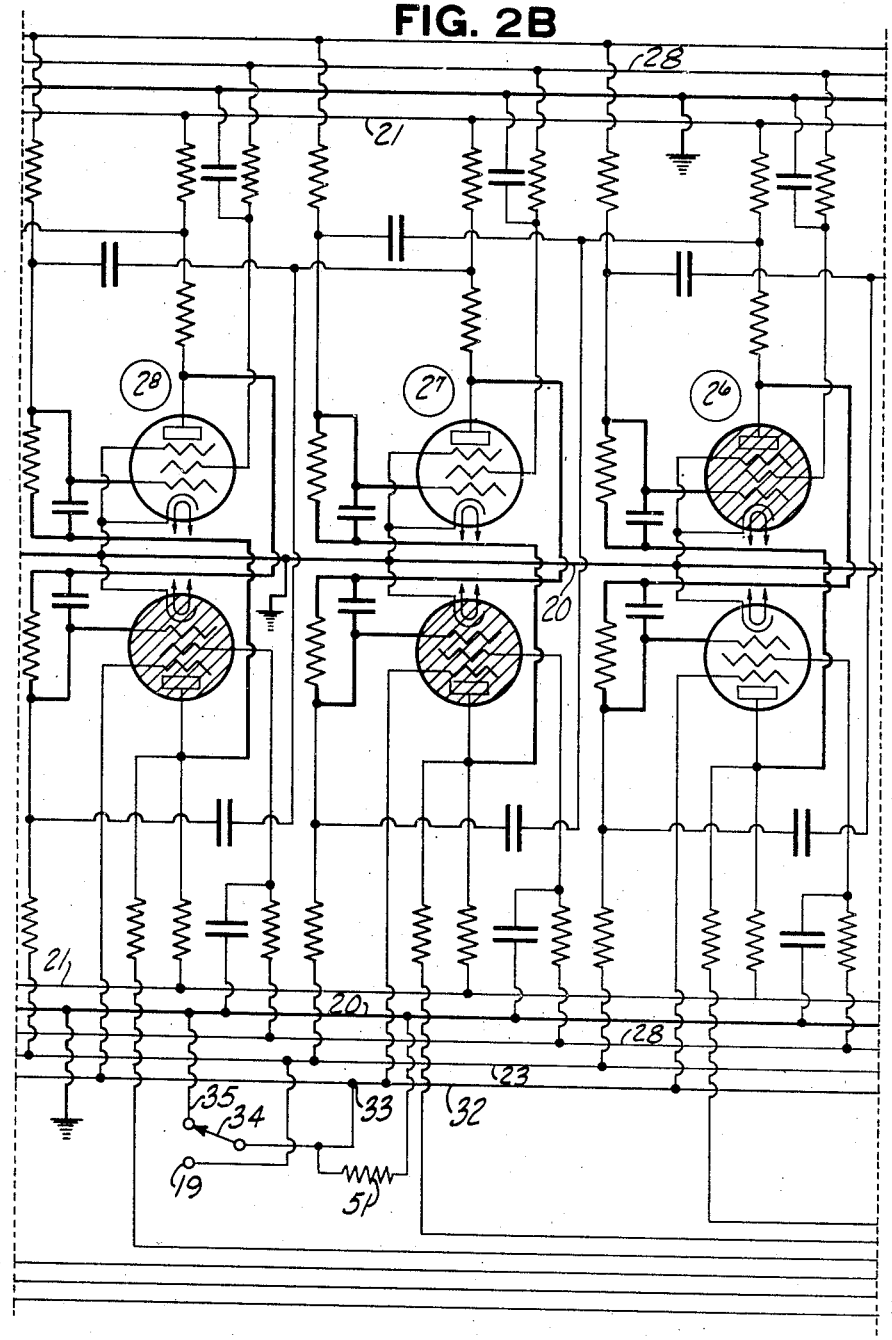
Figure 2C:
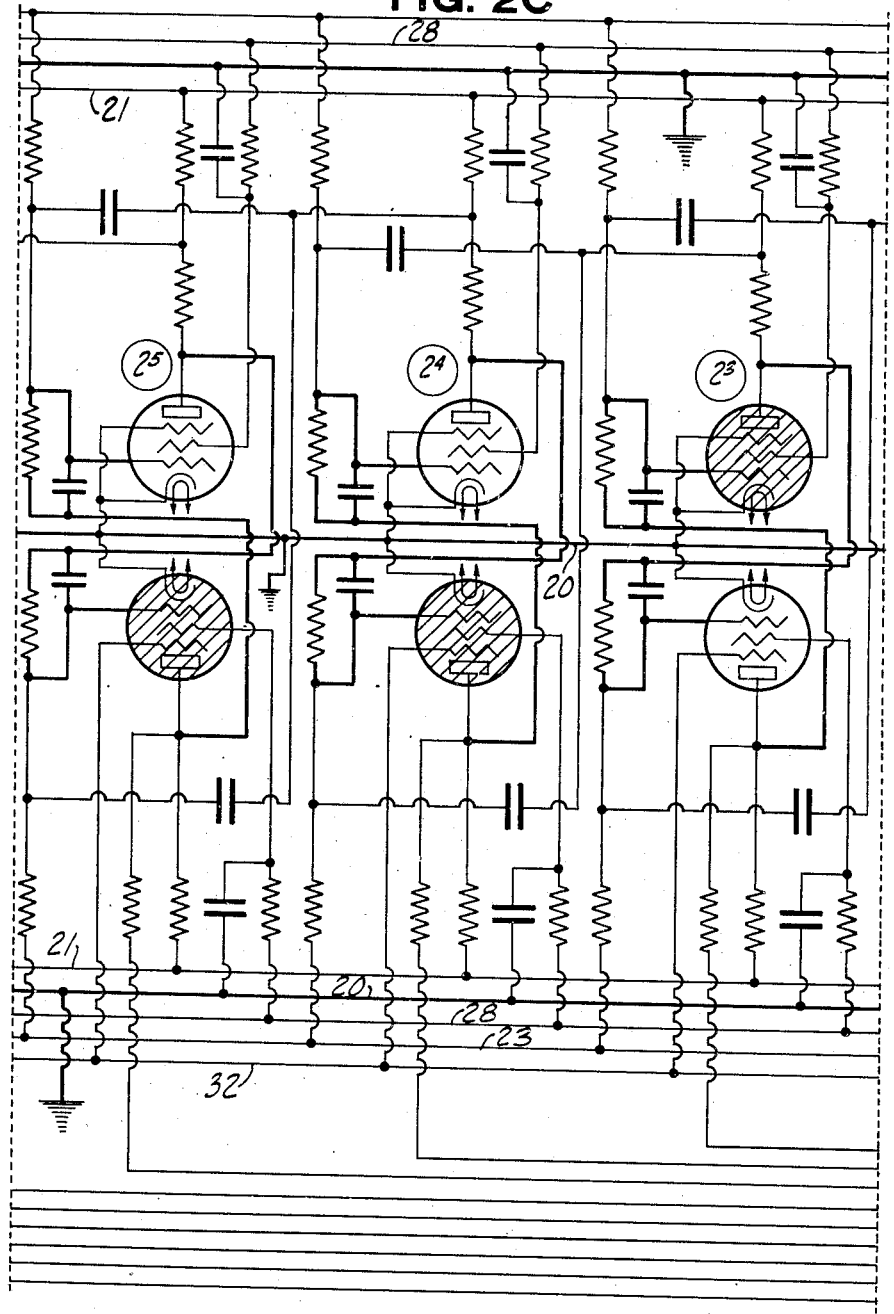

Referring to Figs. 2A, 2B, 2C, and 2D, there is shown a group of twenty-four high-vacuum electron tubes, connected in twelve trigger pairs, whereby one tube or the other tube of a pair is conducting and the other tube of the pair perforce is non-conducting at any given instant. Referring to Fig. 2D, there are shown three pairs of trigger-connected tubes, which are designated $2^0$, $2^1$, and $2^2$. Fig. 2C shows three more pairs of trigger-connected tubes, designated by pairs $2^3$, $2^4$, and $2^5$. In Fig. 2B are three pairs of trigger-connected tubes, representing $2^6$, $2^7$, and $2^8$. In Fig. 2A are the remaining three pairs of trigger-connected tubes in the binary counter, representing the denominations $2^9$, $2^{10}$, and $2^{11}$. The zero condition of any of these denominations is when the mode of operation is such that the upper tube of that pair is in a conducting condition. If a trigger pair is in a mode of operation such that the lower tube is conducting, that signifies that there is counted in that denomination the number "two" to the power which that denomination represents. The condition of a tube's being in a conducting state is represented on these drawings by diagonal lines across the representation of the tube, and, as shown, for purposes of illustration only, the number standing counted in the binary accumulator is equal to $2^{11}+2^9+2^8+2^7+2^5+2^4+2^2+2^0$. Translating this number fully into the decimal system, we have as the number of counted impulses the sum of the following decimal numbers: 2048, 512, 256, 128, 32, 16, 4, and 1, which sum is equal to 2997 in the decimal notation.

The tubes constituting the pair of $2^0$ power, which must respond to each input impulse, are high-vacuum tubes each having a highly-emissive cathode, an anode, a control grid, a screen grid, and a suppressor grid. A tube of the "6AG7" type may be used. The tubes of the other trigger pairs, not requiring as frequent response as the tubes of the $2^0$ power pair, may be of the "1231" type. The tubes of the $2^0$ pair are conditioned to be responsive to positive input impulses, and the tubes of the other pairs are conditioned to be responsive to negative input impulses. The tubes of the $2^0$ pair may be made responsive to negative input impulses, if desired, by changing the bias potentials, as is well known in the art. The pair constituting the $2^0$ power may, if desired and if slightly lower response is sufficient, be like the other pairs of tubes.

The cathodes of all the tubes are heated indirectly by filaments shown conventionally and are grounded by being connected to conductor 20, which is grounded. Each of the anodes of the lower tubes is supplied with a positive potential of 125 volts by being connected to conductor 21, each through a resistor like resistor 22 (Fig. 2D) of 6,000 ohms for the $2^0$ tube and of 25,000 ohms for the rest of the lower tubes. The anode of each of the upper tubes is supplied with a positive potential of 125 volts by being connected to conductor 21, the $2^0$ tube being connected thereto through a resistor like resistor 45 of 5,000 ohms, a point like point 46, and a resistor like resistor 47 of 1,000 ohms. The upper tubes of the higher orders have their anode resistors corresponding to resistors 45 and 47, of a value of 20,000 ohms and 5,000 ohms respectively. Each control grid like grid 48 is connected to a conductor 23 through a resistor like resistor 24 (Fig. 2D) of 91,000 ohms and three points like points 25, 26, and 27. Each screen grid is connected to a conductor 28 through a resistor like resistor 29 (Fig. 2D) of 60,000 ohms and through a point like point 30. Conductor 28 is given a positive potential of about 125 volts through terminal 31 (see Fig. 2A). Each suppressor grid like grid 49 is connected to a conductor 32, which is normally grounded by being connected through point 33 (Fig. 2B), switch 34, and conductor 35 to ground conductor 20. Each anode is connected through a point like point 36 (Fig. 2D), a conductor like conductor 37, a point like point 38, a resistor like resistor 39 of 60,000 ohms in parallel with a capacitor like capacitor 40 of .00002 microfarad, and a point like point 41 to the control grid of the tube paired with it in the trigger circuit.

The switch 34 (Fig. 2B), when in the position shown, grounds the suppressor grid of the lower tube in each of the denominational representing trigger pairs. With the suppressor grids of the lower tubes thus grounded, the tubes of a pair are in condition to receive and be responsive to impulses impressed on their control grids. It will be observed that, when the switch 34 is moved to the terminal 19, supplied with 130 volts negative potential, such potential is applied to conductor 32 (see also Figs. 2A to 2D), and thus the suppressor grid of each of the lower tubes is given a high negative potential, which, with the values of potential and the values of circuit elements given, will cause cessation of conduction in said lower tubes if any are then conducting, and therefore causes conduction to occur in all the upper tubes, thus causing the binary counter to register zero. A 25,000-ohm resistor 51 (see Fig. 2B) is made to connect conductor 32 to ground in order that, when switch 34 is moved from ground to the negative 130-volt terminal, the resistor 51 will act as a means for stabilizing the suppressor grid potential.

Point 52 (Fig. 2D) is impressed, through the input terminal 53, with positive potential impulses of approximately 60 volts amplitude each, said impulses preferably having a steep wave front and an exponential wave decay. From point 52, said impulses are impressed on the control grid of both the tubes representing $2^0$, the upper tube 54 being impressed with said impulses through a capacitor 50 of .000025 microfarad, through point 56, point 57, and point 41 onto the control grid 44 of said tube 54, and said impulses are impressed upon the lower tube 55 of the same trigger pair through capacitor 58 of .000025 microfarad and points 25, 26, and 27 onto the control grid 48 of tube 55.

Points like point 46 between resistors 47 and 45 (Fig. 2D) in the supply conductor for each of the anodes of the tubes of the upper set are connected, through points like point 59, to the control grids of the tubes of the trigger pair constituting the next higher denomination of the binary counter; for instance, point 59 is connected through the capacitor 60 of .00001 microfarad, point 61, point 62, and point 63 to control grid 64 of tube 65, and in a like manner point 59 is connected through capacitor 66 of .00001 microfarad, point 67, point 68, and point 69 onto the control grid 70 of tube 71.

If the tubes are in the condition of conduction, as shown by the diagonal lines, and a positive voltage input impulse of 60 volts is impressed upon terminal 53 (Fig. 2D), the mode of operation of the trigger pair representing $2^0$ will be changed so that tube 54 is conducting and tube 55 is non-conducting. Under these circumstances, point 46, which has heretofore been at a voltage of approximately 125 volts positive, will receive a sudden drop in potential as tube 54 commences to conduct, which negative impulse is impressed through point 59 and capacitors 60 and 66 onto the control grids of their respective associated tubes 65 and 71, the trigger pair constituting $2^1$, and changes the mode of operation of that trigger pair in whatever condition it may have been. There will be no negative potential impulse at point 46 until the next time tube 55 ceases conducting and tube 54 commences conducting, which event occurs at the second input impulse upon point 52 from that input impulse just mentioned. The values of circuit elements and potentials suggested for the "1231" type of tube will render the trigger pairs of $2^1$ and higher orders responsive only to negative impulses as great in amplitude as the drop in potential of point 46 when tube 54 begins to conduct. It will thus be apparent that, with the tubes of the upper set in conducting condition, upon the first impulse impressed on the terminal 53, the tube 55 will become conducting and the tube 54 will become non-conducting. Upon the second impulse impressed on terminal 53, tube 54 will commence conducting and tube 55 will cease conducting, and in addition tube 71 will become conducting and tube 65 will become non-conducting, and so on. At the end of four input impulses, the condition of the binary counter will be such that tube 72 alone, of all the lower tubes, will be conducting, representing that there is accumulated in the counter a sum equal to the second power of two, which, if written, would be signified in the binary notation as "100."

It now becomes apparent how the binary counter works, and it is also apparent that, whenever one of the lower tubes becomes conducting, its anode receives a sharp drop in potential due to the resistor in its potential supply conductor, such as resistor 22 (Fig. 2D). The anode of each of the lower tubes is connected at a point like point 36, by a conductor like conductor 73, through a resistor of 2 megohms like resistor 18, to a terminal like 74, which represents the lower tube and the binary power of the associated trigger pair. Such terminal will, by its potential, represent a conducting condition or a non-conducting condition of its associated tube. The terminals 74, 75, 76, 77, 78, 79, 80, 81, 82, 83, 84, and 85 represent, respectively, the trigger pairs of $2^0$, $2^1$, $2^2$, $2^3$, $2^4$, $2^5$, $2^6$, $2^7$, $2^8$, $2^9$, $2^{10}$, and $2^{11}$, and if any such terminal has its potential rendered more negative by the fact that the lower tube of the trigger pair which it represents is in a conducting condition, then such terminal may be sensed by a wiper arm of a rotary switch, to be described. The connections to such switch are conditioned to cause a response whenever said wiper arm reaches a contact with its potential rendered more negative than the others, which will cause a response in the translating switches, to be described. The potential of such anode-representing points when the corresponding tube is not conducting is approximately 125 volts positive, and such points when the corresponding tube is conducting are about 50 volts positive in the case of the trigger pair representing $2^0$ and about 35 volts positive in a trigger pair representing the higher powers of 2.

The scanning device

In Fig. 3, the terminals 74, 75, 76, 77, 78, 79, 80, 81, 82, 83, 84, and 85 are the same as those shown in Fig. 2D. Ratchet wheel 86, secured to an axle 87, is rotated step by step by pawl 88 secured to a solenoid armature 89, normally held in an upward position by spring 90 away from the solenoid 91. The coils of the solenoid 91 are grounded through armature 89. Contact 92 is broken when the armature is attracted to the solenoid, deenergizing the solenoid, which is supplied with operating potential through conductors 93 and 94. The contacts connected to ring conductor 94 are wiped by arm 95, secured to axle 87, as the ratchet wheel and the axle 87 turn. Arm 95 is connected by conductor 96 and switch 97 to a potential supply terminal 98, supplied with operating potential. With switch 97 closed, the ratchet wheel and the axle will keep turning step by step until contact 99 is reached, at which point, because contact 99 is not connected to ring conductor 94 except through switch 100, which is the operator's switch referred to in Fig. 1, the ratchet wheel 86 will be stopped. Upon the temporary closing of the switch 100, contact 99 will be energized, and the entire ring of contacts will be scanned until the contact 99 is again reached, upon which event the scanning action will stop. Wiper arms 101, 135, and 103 are all secured to axle 87, said axle being of non-conducting material, or, if of conducting material, having the arms insulated therefrom, and are turned with it step by step. Wiper arm 103, in rotating, scans contacts representing the terminals 74 to 85 inclusive, said contacts being alternated with contacts such as contact 43 for purposes to be described.

The structure so far explained provides for the counting of impulses at the rate of one million or more a second, the energizing of twelve terminals in accordance with associated tubes of a twelve-denominational binary counter, and the scanning of said terminals under control of an operator's switch. Each of said twelve terminals is provided to control the operation of an associated solenoid-operated switch. It is the function of these switches to set up conditions by closing certain circuits and opening other circuits whereby a decimal denominational impulse producer is controlled to produce impulses in accordance with the data accumulated in the binary counter.

Each of the lower tubes of the binary counter, and each of the terminals 171 to 182 inclusive (Figs. 3, 4A, 4B, 4C, 4D, 4E, and 4F), represents a denomination of the binary system of numerical notation.

It is seen that terminal 178 (Fig. 3) represents the contact on which wiper arm 135 rests and therefore represents terminal 78, on which coordinated wiper arm 103 rests, which represents the tube (see Fig. 2) representing the binary denomination $2^4$, which is $2 \times 2 \times 2 \times 2$, which is "16" in the decimal notation. Therefore, it is the function of the solenoid 207 (Fig. 4D), energized by terminal 178, to set up such a condition in the decimal impulse producer that six impulses shall be produced for the units order of the decimal system and one impulse shall be produced for the tens denominational order of the decimal system. If we examine Fig. 2D, it is found that the tube representing $2^0$ is conducting, and therefore the solenoid 200 (Fig. 4A), representing $2^0$, will be operated as the scanning device moves across the contact representing that tube, and when that occurs, a condition will be set up in the decimal system impulse producer whereby one impulse is produced in the decimal denominational order representing units. The tube 72 (Fig. 2D), representing $2^2$, or "4" in the decimal notation, is also conducting and will, through the scanning device, set up a condition in the decimal impulse producer, at a different time, whereby four impulses are produced for the units denominational order of the decimal accumulator. Referring to Fig. 2C, it is found that the tubes representing $2^4$ (previously mentioned) and $2^5$ are conducting. Because $2^5$ represents "32" in the decimal system of numerical notation, two impulses will be produced by the units order and three impulses will be produced by the tens order of the impulse producer. Referring to Fig. 2B, it will be seen that the tube representing $2^7$ is conducting, which represents the number "128" in the decimal system, and consequently, when that tube's contact is scanned, a condition will be set up in the decimal impulse producer whereby eight impulses will be produced for the units order, two impulses will be produced for the tens order, and one impulse will be produced for the hundreds order. As the examples given will give a full understanding of the functioning of the scanning device and the function of the translating switches, the remainder of the denominations of the binary counter will not be explained.

The scanning operation is rapidly performed step by step, but the decimal denominational impulse producer operates so quickly that the impulses are produced many times more rapidly, and no interference results between the scanning operation and the impulse producing operation, even though the total scanning operation of all the twelve tubes may occur in less than a second. The tubes are scanned in order from that tube representing $2^0$ to that tube representing $2^{11}$. Wiper arm 103 (Fig. 3), in making one complete rotation, contacts 24 contacts, every other one of said contacts receiving its potential from one of the terminals 74, 75, 76, 77, 78, 79, 80, 81, 82, 83, 84, and 85, a contact in case the associated tube of the binary counter is not conducting having a potential of approximately 125 volts positive and having, in case the associated tube is conducting, a potential of 50 or 35 volts positive. The intermidate contacts, which are connected to ring conductor 104, are given a potential by being connected through resistor 105 of one megohm, point 106, and conductor 107 to terminal 108, supplied with a potential of 100 volts positive. Point 106 is also connected to the screen grid of high-vacuum electron tube 109, which may be of the "6Y6G" type. High-vacuum triode 110, which may be of the "6SF5" type, is given a plate potential through point 111, resistor 112 of 100,000 ohms, and point 113. Point 113 is grounded through point 114 on one side and is connected through a resistor 115 of 50,000 ohms, point 116, resistor 117 of 60,000 ohms, and point 118 to a potentiometer 119, which is grounded on one side to point 120 and connected to a negative potential supply of 250 volts by connection to terminal 121 on the other side. The potentiometer is adjusted to give point 118 a normal negative potential of about 110 volts. Point 111 will be at ground potential unless conduction takes place in tube 110, whereupon point 111 will assume a potential of approximately 35 volts negative, with the potentials given, as cathode 122 is at approximately a potential of 50 volts negative, being connected to point 116, which is connected to grounded point 113 on one side through resistor 115 of 50,000 ohms and connected to the 110-volt negative supply through resistor 117 of 60,000 ohms. With wiper arm 103 normally at a positive potential of from 100 volts to 125 volts positive, with none of the lower tubes of the binary counter conducting, depending on which contact it is resting on, which potential affects grid 123 of triode 110, through point 124 and resistor 125 of two megohms, point 124, also being connected through resistor 126 of one megohm to point 118, which is supplied with a negative potential of 110 volts, makes the resultant effective bias on grid 123 approximately 45 volts negative, which is five volts positive, with respect to the cathode 122. In a tube of this type, with the potentials given, conduction will occur. If the grid be rendered negative by at least several volts with respect to the cathode, conduction will cease. When wiper arm 103 senses a contact corresponding to a conducting tube in the binary counter, the voltage on grid 123 will become so negative as to cut off conduction in tube 110, which causes a potential rise at point 111, thereby causing the grid of tube 109 to become more positive. This potential rise at point 111 amounts to approximately 30 volts. Grid 130, which is at all times at the potential of plate 131 of tube 110, is at a potential to just prevent conduction in tube 109 when triode 110 is conducting. Tube 109 is given a plate potential of 100 volts positive taken through point 132 and has a normal cathode potential of ground taken through point 114. Point 132 takes its potential from conductor 136 and point 134, which obtains its potential through wiper arm 135 and the contacts which said wiper arm wipes in its rotation. It will be noted that there are twice as many contacts indicated for wiper arm 135 to pass over as there are connections thereto, half of said contacts being dead. Each of the other contacts is connected through an associated conductor, said conductors being numbered 151 to 162 inclusive, to terminals 171 to 182 inclusive. Each of these terminals 171 to 182 inclusive is connected to and has the positive potential of associated solenoid windings, as will be explained. Consequently, whenever tube 109 is conducting and wiper arm 135 is on a solenoid-representing contact, current passes through the associated solenoid, causing operation of an armature and connected switches. (See Figs. 4A, 4B, 4C, 4D, 4E, and 4F.) Although the solenoid coils 200 to 211 inclusive, heretofore referred to, are supplied with a potential of approximately 100 volts, the potential drop through the coil, acting as a resistance, is approximately 50 volts, making the effective potential on the plate of tube 109 approximately 50 volts.

Terminal 170 (Figs. 3 and 4F) is connected through a solenoid 212 (Fig. 4F) to a 100-volt positive potential terminal 108 (Fig. 4A) when any of the solenoids 200 to 211 are operated, as will be explained, and is connected through conductor 150 (Fig. 3), point 183, capacitor 184 of 4 microfarads, through wiper arm 101, and the contacts connected to conductor 185, over conductor 186 to point 132 and the plate of tube 109. Therefore, as the wiper arm 101 wipes over its associated contacts synchronously with the other wiper arms 135 and 103 of the scanning device, each time the arm 101 contacts one of the contacts connected with conductor 185 and tube 109 is at the same time conducting, a momentary surge of current will be caused in conductor 150, through terminal 170 and solenoid 212 (Fig. 4F) connected therewith, said surge of current lasting until capacitor 184 (Fig. 3) is charged. The resistance of relay windings 212 and the capacitor 184 are chosen to cause terminal 360 to remain closed long enough to allow the necessary operation of the impulse producer. Solenoid 91 (Fig. 3) is timed accordingly. On the alternate contacts, which are connected by conductor 187 and over which arm 101 wipes, the capacitor 184 is discharged through resistor 189 of 300 ohms. Thus, as the rotary switch makes one complete scanning operation covering the 24 contacts, and wiper arm 103 senses a contact representing a tube in the binary counter that is in a conducting condition, the solenoid representing a conducting tube will cause the associated translating switch to be operated.

Capacitor 190 of 16 microfarads is provided for the purpose of assuring a constant potential at point 118 unaffected by any transient conditions in the potential supply.

It will be observed, referring to Fig. 3 and Figs. 4A to 4F inclusive, that the terminals 171, 172, 173, 174, 175, 176, 177, 178, 179, 180, 181, and 182 represent, respectively, $2^0$, $2^1$, $2^5$, $2^9$, $2^2$, $2^6$, $2^{10}$, $2^4$, $2^8$, $2^3$, $2^7$, and $2^{11}$, which in turn are represented by solenoids 200, 201, 202, 203, 204, 205, 206, 207, 208, 209, 210, and 211, respectively.

Switch 213 (Fig. 4F) furnishes the potential to terminal 360 (see also Fig. 5A) for operating the tubes of the decimal impulse producer, and hence, to make certain that for a given scanned terminal the intended one of the solenoids 200 to 211 inclusive (Figs. 4A to 4F inclusive), representing the scanned trigger pair of the binary counter, is operated during the time the decimal impulse producer is energized, it is arranged that the decimal impulse producer receive its potential supply through switch 213 only after the selected one of the solenoids 200 to 211 inclusive has operated, thus delaying the operation of the impulser until the translating switching has been accomplished.

Figure 4B:
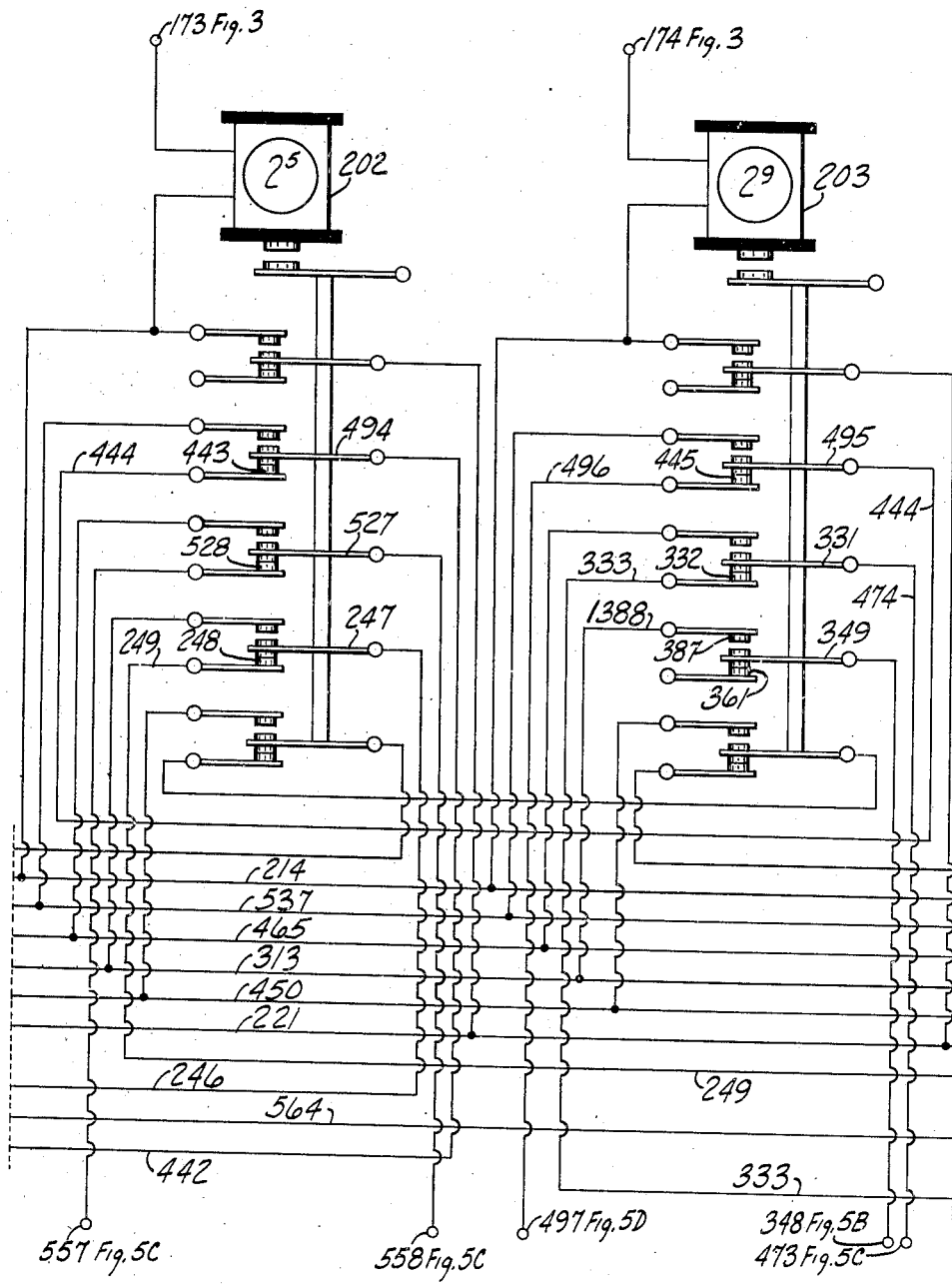

This is shown in Fig. 1 as a delay switch, and it is further arranged that the impulse producer is cut off from its potential supply before the selected one of said solenoids 200 to 211 inclusive is deenergized. The solenoid coils 200 to 211 inclusive are connected to a common potential supply line 214, which is given a potential of 100 volts from terminal 108 (Fig. 4A). Each of the said solenoids operates an armature to which is connected a switch bar to which five switching contacts are attached. Referring to Fig. 4A as an example, the contacts 220, when closed, connect the 100-volt supply conductor 214 to conductor 221 (Figs. 4A to 4F inclusive), thus causing solenoid 212 (Fig. 4F) to be energized.

Referring again to solenoid 200 (Fig. 4A) and the bar 230, raised by said solenoid when energized, the four switches 231, 232, 233, and 234 are moved from contacts 235, 236, 237, and 238, respectively, breaking said contacts and making against contacts 239, 240, 241, and 242, respectively. When this is done, conditions are set up whereby the decimal impulse unit sends out one impulse in the units order of the decimal system. In a similar manner, when solenoid 201, representing $2^1$, is energized, four contacts are broken and four contacts are made, setting up a condition in the differential decimal impulse unit whereby two impulses, representing $2^2$, are sent out by the units order of the decimal impulse producer. In a similar manner, when solenoid 202 (Fig. 4B), representing $2^5$, is energized, four contacts are broken and four contacts are made, setting up a condition in the decimal impulse producer whereby two impulses are sent out in the units order of the decimal impulse producer and three impulses are sent out in the tens order of the decimal impulse producer to represent the number "32" in the decimal notation.

Considering again solenoid 200 (Fig. 4A), the contacts 235 and 239 control the units bank of the decimal impulse producer; the contacts 236 and 240 control the tens bank of the decimal impulse producer; the contacts 237 and 241 control the hundreds bank of the decimal impulse producer; and the contacts 238 and 242 control the thousands bank of the decimal impulse producer. The corresponding contacts associated with the other solenoids 201 to 211, respectively, control the units, tens, hundreds, and thousands banks of the impulse producer as described for solenoid 200.

*The decimal impulse producer*

Consideration must now be given to the elements in the decimal impulse producing unit, which will first be explained functionally.

Figure 4F:
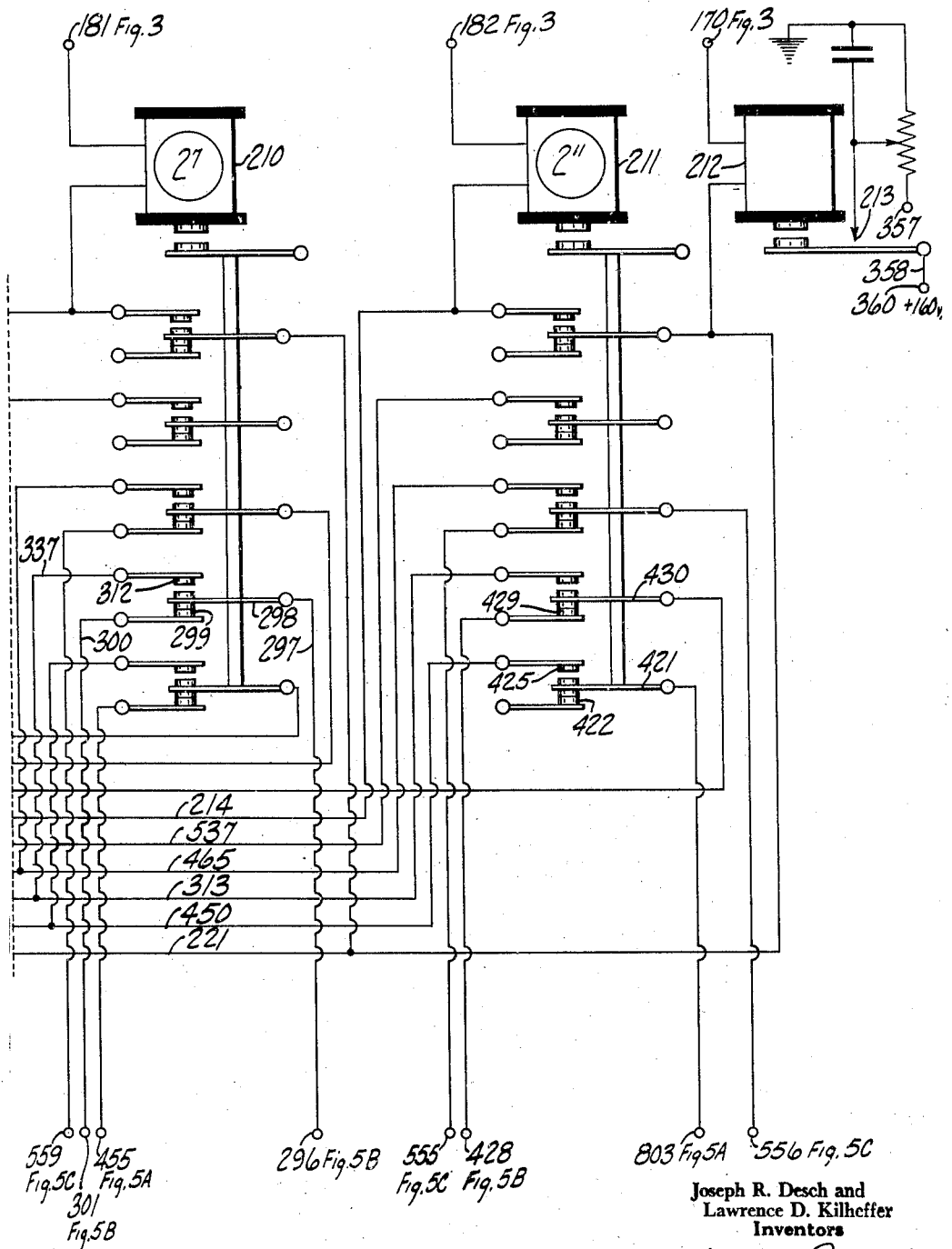
Figure 5B:
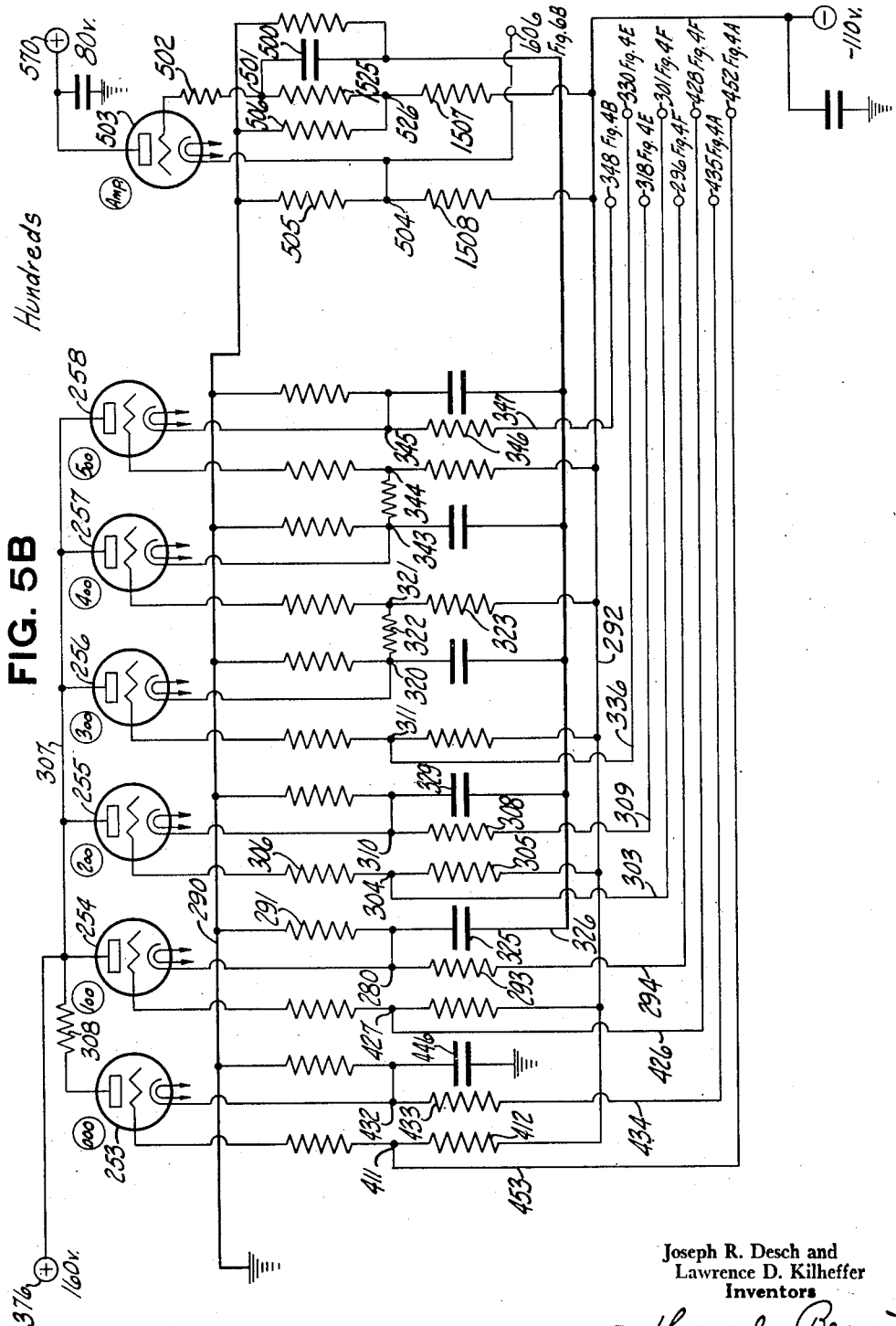

Fig. 5A shows the thousands bank of the decimal impulse producer together with the starting tube S, which starting tube initiates the operation of all the banks of the impulse producing unit. The application of potential to terminal 300 by the closing of switch 213 (see Fig. 4F) causes the gaseous triode electron tube S to fire. All the digit-representing tubes in the impulse unit are grid-controlled gaseous triodes, and all of said tubes, when given anode-cathode potential ordinarily sufficient to cause a discharge, are normally prevented from firing by reason of a controlling potential impressed upon their control grids. The tube S, however, has less than controlling potential impressed upon its control grid for the anode-cathode potential applied thereto, and consequently a discharge ensues therein as soon as said switch 213 is closed. The gaseous triodes numbered, respectively, 250, 251, and 252 together represent the thousands order of the decimal impulse unit and individually represent, in the decimal notation, "0000," "1000," and "2000," respectively. In Fig. 5B, the hundreds order of the impulse unit, tubes 253, 254, 255, 256, 257, and 258 represent, respectively, in the decimal notation, "000," "100," "200," "300," "400," and "500." In Fig. 5C, the tens order of the impulse unit, the tubes 259, 260, 261, 262, 263, 264, and 265 represent, respectively, in the decimal notation, "00," "10," "20," "30," "40," "50," and "60." In Fig. 5D, the units order of the impulse unit, tubes 266, 267, 268, 269, 270, 271, 272, and 273 represent, respectively, in the decimal notation, "1," "2," "3," "4," "5," "6," "7," and "8." It will be noted that provision is made for only two significant digits in the thousands bank, for five significant digits in the hundreds bank, for six significant digits in the tens bank, and for eight significant digits in the units bank, because, as has been stated, in dealing with the powers of two ranging from $2^0$ through $2^{11}$, no decimal digit higher than 2 in the thousands order, or higher than 5 in the hundreds order, or higher than 6 in the tens order, or higher than 8 in the units order is necessary to represent any of such powers of two. It is arranged that, if any one of said digit-representing tubes in the different denominational orders (the zero tubes excepted) are caused to discharge, a potential impulse is sent through an amplifier electron tube onto an output conductor, so that, for instance, if the "100," "200," "300," and "400," representing tubes 254, 255, 256, and 257 (Fig. 5B), are caused to discharge one after another in sequence, there will be four electric potential impulses impressed in succession upon the output conductor representing the hundreds bank of the impulse producer.

The zero tubes are provided for use when it is necessary to shunt the initiating impulse received from the starting tube, or from a tube of a next higher denominational bank, in case no impulses in the bank of the zero tube in question are to be produced, to the next bank in which an impulse is to be produced. Each zero tube in firing produces an impulse which starts the operation of the digit-representing tubes in its bank or the zero tube of the next lower bank. If impulses are to be produced in the thousands bank, the hundreds bank, or the tens bank, then the last tube to discharge in that bank, said last tube representing the total number of impulses to be sent from that bank or representing zero, causes an impulse to be transferred by means of the switching unit, shown in Figs. 4A, 4B, 4C, 4D, 4E, and 4F, to the zero tube of the next lower denomination to cause it to become conducting. In case said next lower denomination is not to produce any impulses, then the zero tube impulse is transferred to the zero tube of the next lower denomination. A zero tube is not provided for the units denomination, as it would serve no purpose, no transfer of the starting impulse to any lower denomination being required. In any of the decimal numbers representing a power of two, up to $2^{11}$, there is always a need for impulses to be produced from the units bank, as none of the decimal numbers representing powers of two up to $2^{11}$ ends in zero. The starting tube S, the zero tubes, and the digit-representing tubes of the impulse producer are, as has been said, gaseous triodes. The gaseous triodes shown are of the thermionic cathode type, and the potentials used are such as those used on available commercial tubes representative of the type. The heater circuits for the cathode filaments have not been shown, and said filaments are shown conventionally. The electrodes of all the tubes of the impulse producer are given their potentials in a manner to be explained in connection with the tubes representing the hundreds order (Fig. 5B).

Point 280, connected to the cathode of tube 254, is connected to a grounded conductor 290, through a resistor 291 of 25,000 ohms, and is connected in the following manner to a conductor 292 having a negative potential of 110 volts: from point 280 through resistor 293 of 50,000 ohms, conductor 294, terminal 296 (see also Fig. 4F), switch 298 and contact 299, conductor 300, terminal 301 (see Fig. 5B), conductor 303, point 304, and resistor 305 of 50,000 ohms to conductor 292, before mentioned, which gives point 280 and the cathode of the "100" representing tube a potential of about 22 volts negative.

It will be observed that point 304 is connected to the grid of the tube representing "200" through a resistor 306 of 250,000 ohms. Therefore, the normal potential of said grid is about 56 volts negative or about 34 volts more negative than the associated cathode, as the cathode of the "200" tube gets its potential of 22 volts negative through point 310 in a manner similar to that just described for point 280, assuring a controlling bias to prevent a discharge under normal conditions. The anodes are given a potential of 160 volts positive by being directly connected to conductor 307 supplied with that potential through point 376 (see Fig. 5A). It should be noted that between the anode of the zero tube and the anode supply conductor there is a resistor 308 of 5,000 ohms to prevent oscillation in the zero tube which might be caused by the capacitor 446 of .00025 microfarad coupling the cathode to ground, which gives rise to a high initial current.

If a discharge occurs in tube 254, point 280 will rise in potential to about 145 volts positive, which rise in potential will be impressed upon point 304 by way of resistor 293, conductor 294, terminal 296 (see Fig. 4F), conductor 297, switch 298, contact 299, conductor 300, terminal 301 (see Fig. 5B), and conductor 303 to said point 304. The potential rise at point 304 will be sufficiently great to cause the control grid of the tube 255 to lose control, causing tube 255 to fire and become conducting, which discharge causes a potential rise at point 310, which potential rise is impressed on point 311 through resistor 308 by means of conductor 309, terminal 318 (see also Fig. 4E), conductor 319, switch 324, contact 327, conductor 328, terminal 330 (see Fig. 5B), and conductor 336 to point 311 to fire and render conducting the "300" tube 256 unless the corresponding solenoid 208 (Fig. 4E) is operated.

To return to the discussion of point 280 (Fig. 5B), representing the cathode of tube 254, if the point 280 is disconnected by reason of the movement of switch 298 from contact 299 (Fig. 4F), then the "200" tube 255 (Fig. 5B) will not have its grid raised to cause it to fire, but the rise in potential of point 280 will be transferred by means of moved switch 298 (Fig. 4F) to contact 312, and by that means through conductors 337 and 313 (see also Figs. 4A, 4B, 4C, 4D, and 4E), terminal 314 (see Fig. 5C), and conductor 316 to point 317, which leads to the grid of the zero tube of the tens bank of the decimal impulse producer, causing said zero tube to fire. Therefore, it is seen that, if switch 298 (Fig. 4F) is moved from contact 299 to contact 312, which is the case if solenoid 210 is energized, said solenoid representing $2^7$, then, upon the firing of the tube 254 (Fig. 5B) in the hundreds bank, representing "100," the positive potential surge caused at point 280 will be transferred to the zero tube of the tens denominational order instead of to the "200" tube of the hundreds denominational order. If $2^7$ is expressed as a decimal number, it is found that said number is "128," which means that there is one impulse to be produced in the hundreds order, which will have been accomplished by the firing of the tube representing "100," the initiating impulse thereupon being transferred to the next lower denominational order, which is the tens bank, as has been described.

As there is no need for stopping the sequential action in the hundreds bank immediately after the "300" tube or the "400" tube fires, and consequently there being no need to route the firing impulse at that time to the next lower denominational bank, no routing of the positive potential cathode impulse through the switching units of the circuit, shown in Figs. 4A to 4F, is necessary, because, following the firing of any one of the tubes just named, it is necessary to fire the next tube in its own bank, and therefore, as is represented by the connection between point 320 and point 321 (Fig. 5B), the positive rise in potential at point 320 is transferred directly to point 321 without going through the switching unit, and the resistors 322 and 323, connecting point 320 with conductor 292, maintain the proper potential for the cathode of the "300" tube 256. The change in potential of each point like point 280 is, in addition to its use in firing the next tube, conveyed through an associated capacitor, like capacitor 325, of .02 microfarad, to a common output conductor 326 for the denominational bank, which, as will be explained, is coupled to the grid of an amplifier tube 503 so as to create one amplified impulse on the input line to the decimal impulse accumulator unit representing the hundreds order for each positive potential impulse produced in conductor 326. All of the digit-representing cathodes of a denomination of the impulse producer being connected in parallel by capacitors such as capacitor 325 and a conductor such as conductor 326, it is apparent that, if a tube such as tube 254 is conducting and thereafter the next tube 255 becomes conducting, the rise in potential of point 310 will be conveyed through capacitor 329, conductor 326, and capacitor 325 to point 280, which point and the cathode associated therewith, at that time being within about 15 volts of the potential of the anode of tube 254, temporarily cause the cathode to become more positive than the associated anode, which extinguishes the tube 254. In this manner, the digit tubes in each bank, as far as they are operated, operate one at a time in sequence. The zero tubes in the banks, however, are coupled through a capacitor, like capacitor 446, to ground instead of to a conductor like conductor 326 and hence are not extinguished but continue conducting until the operation is completed. The fact that the zero tubes remain conducting prevents the initiating of any anomalous operation of the corresponding one of the banks of impulse-producing tubes, which condition might occur due to transient potentials such as are caused by the chattering of switches. Introduction of a resistor, like resistor 407 (Fig. 5A), of 5,000 ohms, into the anode supply line, if common to adjacent banks, will cause the extinguishing of the last conducting tube in a bank by reason of the zero tube of the next bank becoming conducting, as such act of conduction causes a potential drop of the anodes, bringing the anode of the last conducting tube below the potential of the associated cathode, because the charging of the cathode capacitor of the firing tube holds that cathode temporarily at or near ground potential, and the cathode of the last conducting tube is held above ground potential by the charge on its cathode capacitor.

It is not necessary to follow the switching circuit for translating each possible condition, but, as the scanning wiper arms have been shown as stopping on the contacts representing $2^4$ or, as expressed in the decimal system, "16," and as this operates solenoid 207, whose armature is shown in raised position, that switching circuit will be followed to show how the number "16" is produced in terms of impulses in the decimal notation and to explain the switching system as a whole.

As the solenoid 207 (Fig. 4D) is energized, the operating bar 350 is raised, operating switches 351, 352, 353, 354, and 355. Switch 351 in its lower position rests against a dead contact and in its upper position rests against contact 356, which, as has been explained before, has a positive potential of 100 volts, being connected to conductor 214, which potential is transferred through switch 351 and conductor 221 to operate solenoid 212 (Fig. 4F), which closes switch 213 and transmits 160 volts positive potential from terminal 357 to conductor 358 and terminal 360 (Fig. 5A) to supply anode operating potential to the starting tube S and to all the zero and digit-representing tubes in the decimal impulse-producing unit.

From terminal 360 (Fig. 5A) the anode of the starting tube S is supplied with potential through resistor 362 of 300 ohms, points 364, 365, 366, and resistor 367 of 250,000 ohms. At point 368, the anode of the S tube is coupled through a capacitor 369 of .00025 microfarad and a resistor 370 of 5,000 ohms to point 365. The potential of the grid of the S tube is the potential of point 371, which is connected through point 363, through a resistor 372 of 250,000 ohms, to the terminal 360, and is connected to a negative 110-volt potential terminal through a resistor 373 of 250,000 ohms. The cathode of the S tube is given a potential of about 22 volts negative by being connected to ground through resistor 399 of 75,000 ohms and being connected to the 110-volt negative terminal through resistor 381 of 300,000 ohms. Before the application of potential to terminal 360, point 371 is highly negative with respect to the cathode, but on the application of potential to terminal 360, point 371 becomes positive enough to cause a discharge in tube S after capacitor 374 of .001 microfarad has become charged, this capacitor being provided to delay the operation of the starting tube S until the mechanical switching has been completed and all the tubes in the impulse-producing unit are ready to become conducting. The path from point 365 through resistor 370 and capacitor 369 to the anode of the S tube provides a preliminary discharge current of relatively high amperage, which, as soon as capacitor 369 is charged, is reduced to a very small amperage by reason of resistor 367, which is, as has been stated, of 250,000 ohms' value. This initial high current upon tube S becoming conducting causes a sharp rise in potential at point 380 due to the combined effect of the 300,000-ohm resistor 381 connecting said cathode to the negative 110-volt supply conductor and of the resistor 399 connecting point 380 to ground. Said rise in potential of point 380 is impressed through capacitor 382 of .00005 microfarad to point 383, which point is connected through a 50,000-ohm resistor 384 to the grid of the zero tube 250 of the thousands decimal order bank. The zero tube 250 obtains its anode potential from point 390 through resistor 391 of 5,000 ohms, and its cathode potential is obtained through point 392, which, when no thousands decimal impulses are required, is connected on one side through resistor 393 of 50,000 ohms, conductor 394, terminal 396 (see Fig. 4A), conductor 397, through switch 234 and contact 238, and the lower contacts of the bottom switches of the solenoids $2^1$, $2^5$ (see Fig. 4B), $2^9$ (see Fig. 4C), $2^2$, $2^6$, and the upper contact 385 (Fig. 4D) of switch 355 associated with solenoid $2^4$, through conductor 450 to terminal 452 (see Figs. 4A and 5B), conductor 453, point 411, and resistor 412 of 50,000 ohms to the negative 110-volt terminal, and is connected on the other side of point 392 (Fig. 5A) through resistor 406 of 25,000 ohms to ground. Point 392 is coupled to ground through capacitor 408 of .02 microfarad.

Figure 4D:
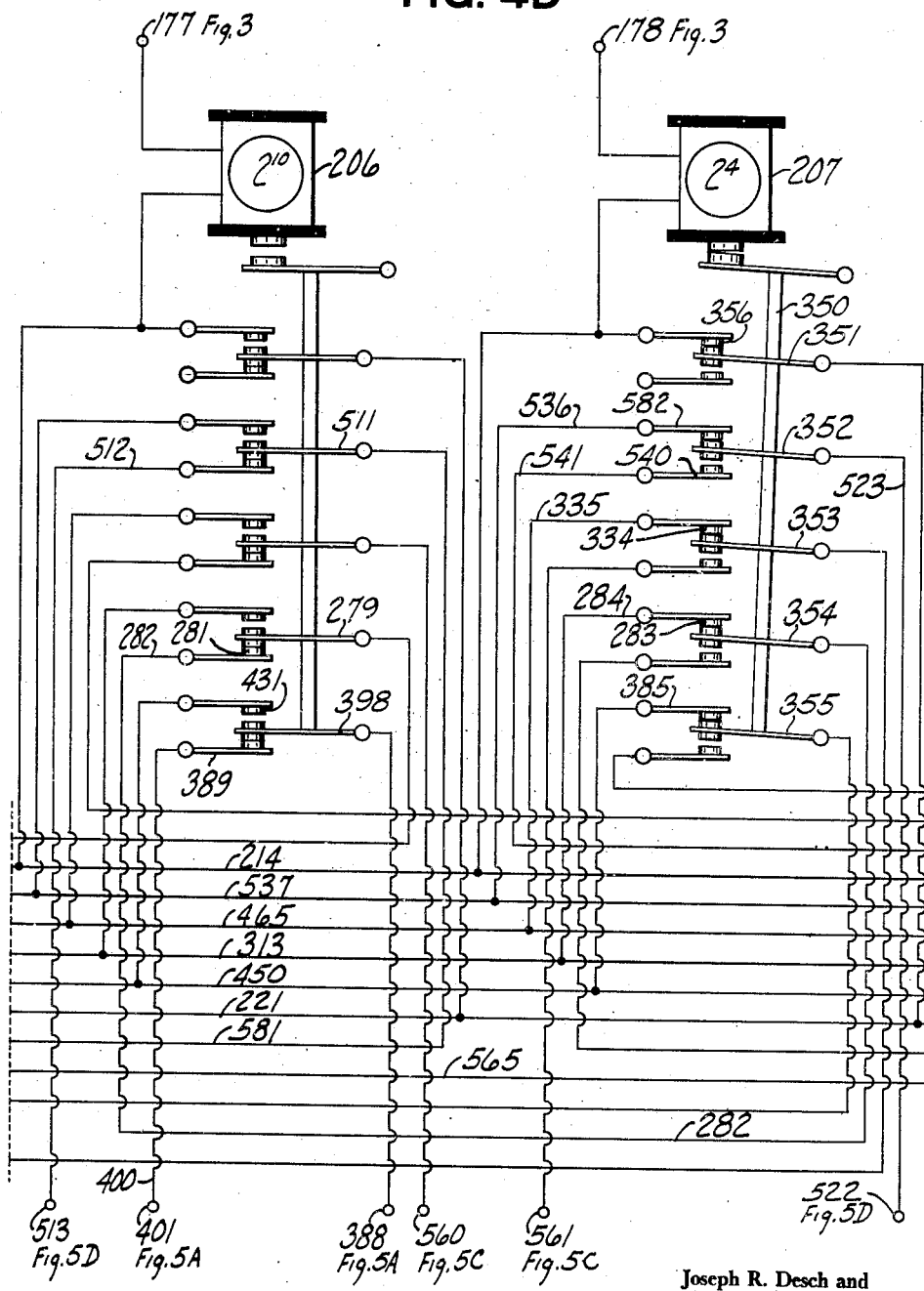

It is apparent that, when the bottom switch on any of the solenoids below $2^{10}$ in value is moved upwardly, point 392 (Fig. 5A) is connected to point 411 (Fig. 5B), and, on the other hand, if none of said switches of solenoids below $2^{10}$ is moved upwardly, point 392 (Fig. 5A) is connected to point 410, as will be described: from point 392, through resistor 393, conductor 394, terminal 396 (see Fig. 4A), through the lower contacts of the bottom switches of solenoids $2^0$, $2^1$, $2^5$ (see Fig. 4B), $2^9$, $2^2$ (see Fig. 4C), $2^6$, $2^4$ (for example, if on the bottom contact contrary to the position shown in Fig. 4D), $2^3$ (see Fig. 4E), $2^3$, $2^7$ (see Fig. 4F), terminal 455 (see Fig. 5A), conductor 456, point 410 connected through resistor 425a of 50,000 ohms to the negative 110-volt terminal.

As the "0000" tube 250 fires and becomes conducting on account of the impulse impressed on its grid through the operation of the S tube, its anode potential drops sharply as capacitor 408 charges, due to resistors 362, 407, and 391, resistor 362 being of 300 ohms, resistor 407 being of 5,000 ohms, and resistor 391 being of 5,000 ohms. As capacitor 408 becomes fully charged, the resistors in the cathode supply of tube 250 causes point 410 (or point 411, Fig. 5B) to become more positive. With neither of the solenoids $2^{10}$ or $2^{11}$ operating, the rise in potential of point 392 (Fig. 5A) appears at point 411 (Fig. 5B) and causes the "000" tube 253 to fire and become conducting.

Operation of any of the solenoid switches except $2^{10}$ and $2^{11}$ connects the bottom switch to the common conductor 450 (see Figs. 4A to 4F), which transfers the cathode impulse to the next lower bank of the impulse producer.

The bottom switch 421 (Fig. 4F), operated by solenoid $2^{11}$, is in contact with a dead contact 422 and is connected through terminal 803 to the cathode of the "2000" tube 252 (Fig. 5A), and, when in contact with the upper contact 425 (Fig. 4F), it connects terminal 803, representing the cathode of the "2000" tube, to common conductor 450 leading through point 411 (Fig. 5B) to the grid of the zero tube 253 of the hundreds bank.

Switch 398 (Fig. 4D) is connected to the cathode of the "1000" tube through terminal 388 (see Fig. 5A) and, when on the lower contact 389 (Fig. 4D), is connected by conductor 400, terminal 401 (see Fig. 5A), and conductor 403 to point 404 leading to the grid of the "2000" tube 252. When switch 398 (Fig. 4D) is on its upper contact 431, it is connected to the common conductor 450 leading to the grid of the "000" tube of the hundreds order. Therefore, on operation of solenoid $2^{10}$, representing "1024" in the decimal notation, the initiating impulse from the cathode of the "1000" tube is transferred to the next lower bank after the "1000" tube has fired, as only one impulse is required in the thousands bank to represent $2^{10}$. On operation of solenoid $2^{11}$, representing "2048" in the decimal notation, the "1000" tube's firing causes the "2000" tube to fire by reason of the routing of the initiating cathode impulse through contact 389 (Fig. 4D) to the grid of the "2000" tube, as has been explained.

Under the circumstances of either solenoid 206 (Fig. 4D), representing $2^{10}$, or solenoid $2^{11}$ (Fig. 4F), representing $2^{11}$, being operated, it being understood that but one solenoid is operated at a time, impulses are required to be produced in the thousands bank of the impulse producer, and the rise in potential of point 392 (Fig. 5A), as has just been explained, effects a rise in potential of point 410, causing tube 251 to become conducting. When solenoid $2^{10}$ is operated, the potential rise of the cathode of the "0000" tube is routed to the "1000" tube by terminal 455 (Fig. 4F).

Because, in the example to be followed, the solenoid 207 (Fig. 4D) has been operated and because switch 355 (Fig. 4D) is connected to common conductor 450 (Figs. 4A, 4B, 4C, and 4D), the rise in potential of the cathode of the "0000" tube as it fires will be impressed on conductor 450, terminal 452 (see Fig. 5B), conductor 453 to point 411, which is connected to the "000" tube of the hundreds bank, starting an operation in that bank by firing the zero tube.

As the cathode of the hundreds zero tube 253 rises in potential upon firing, due to the resistance in its cathode supply circuit, such positive impulse is routed as follows: point 432, resistor 433 of 50,000 ohms, conductor 434, terminal 435 (see Fig. 4A), switch 233, contact 237, conductor 243, switch 244, contact 245, conductor 246 (see Fig. 4B), switch 247, contact 248, conductor 249 (see Fig. 4C), switch 250, contact 274, conductor 275, switch 276, contact 277, conductor 278 (see Fig. 4D), switch 279, contact 281, conductor 282, switch 354, contact 283, conductor 284, common conductor 313, terminal 314 (see Figs. 4A, 4B, 4C, and 5C), conductor 316 to point 317 connected to the grid of the "00" tube 259 of the tens bank of the decimal impulse producer, which will fire the zero tube of the tens bank immediately after the zero tube of the hundreds bank has fired by reason of switch 354 (Fig. 4D) having been raised so as to transfer the cathode impulse of the "000" tube of the hundreds bank to common conductor 313 leading, as just explained, to the grid of the "00" tube grid of the tens bank.

It is apparent that, if any one of the solenoids $2^7$, $2^8$, or $2^9$ be operated, the initiating impulse from the "000" tube 253 (Fig. 5B) will be connected through switch 430 (Fig. 4F), contact 429, terminnal 428 (see Fig. 5B), and conductor 426 to point 427 leading to the grid of the "100" tube 254, as in such case impulses from the hundreds bank need to be produced. There is one impulse needed from the hundreds bank when the $2^7$ solenoid is operated, as $2^7$ is "128" in the decimal system. Consequently, point 280 (Fig. 5B) is connected through resistor 293, conductor 294, terminal 296 (see Fig. 4F), conductor 297, switch 298, contact 312, and conductor 337 to the common conductor 313 leading to the "00" tube of the tens order of the decimal impulse producer by way of terminal 314. When solenoid $2^8$ is operated, representing "256" in the decimal system, then two impulses are necessary to be produced in the hundreds order, and point 280 (Fig. 5B) is connected through terminal 296 (see Fig. 4F), switch 298, contact 299, conductor 300, terminal 301 (see Fig. 5B), conductor 303 to point 304 to fire the "200" tube 255, whose cathode rise in potential is routed from point 310, conductor 309, terminal 318 (see Fig. 4E), conductor 319, switch 324, contact 341, and conductor 342 to common conductor 313 leading to the zero tube of the tens bank of the impulse producer.

The operation of the "300" tube is by means of switch 324 (Fig. 4E), contact 327, conductor 328, terminal 330 (see Fig. 5B), to point 311. The connection of point 320 to 321 and from point 343 to 344 is direct, as $2^9$ requires five impulses in the hundreds bank. The cathode rise of "500" tube 258 is conveyed from point 345 through resistor 346, conductor 347, terminal 348 (see Fig. 4B), to switch 349, which normally rests on dead contact 361 but which, when operated, connects said switch 349 through contact 387 and conductor 1388 to the common conductor 313 and then to the terminal 314 and point 317 (Figs. 4A and 5C).

The cathode rise in potential of the zero tube 259 (Fig. 5C) of the tens bank is impressed on the grid of the tube representing "10"—that is, tube 260—by the following route: from point 460 (Fig. 5C), conductor 461, terminal 462 (see Fig. 4A), conductor 464, switch 232, contact 236, switch 527, contact 528, conductor 564 (see Figs. 4B and 4C), switch 529, contact 530, conductor 565 (see Figs. 4D and 4E), switch 531, contact 532, terminal 467 (see Fig. 5C), and conductor 468 to point 469 connected to the grid of said "10" tube 260.

It will be observed that $2^0$, $2^1$, $2^2$, and $2^3$ are the only powers of 2 up to $2^{11}$ which have no tens decimal digits, and therefore, if one of the solenoids $2^0$, $2^1$, $2^2$, or $2^3$ is operated (Figs. 4A to 4F), the one of switches corresponding to switch 232, 527, 529, and 531 is shifted to the upper contact, which routes the rise in potential of the cathode of the "000" tube to common conductor 465, terminal 533 (see Figs. 4A and 5D), conductor 476, to point 477 leading to the "1" tube 266 of the tens bank, starting an operation in that bank. There being a units digit in every decimal number representing $2^0$ up to $2^{11}$, there is no need for a zero tube in the units bank.

As in the higher banks, the rise in cathode potential is routed to one of two places, either to the grid of the next higher digit tube in the bank or to the first tube of the next lower bank, and, if there be no next lower bank, as is the case with the units order, then the impulse is dissipated onto a source of negative potential.

In the supposed example, where the $2^4$ solenoid has been operated (Fig. 4D), the route of the firing impulse will be followed from the cathode of the zero tens tube: point 460 (Fig. 5C), conductor 461, terminal 462 (see also Fig. 4A), conductor 464, switch 232, contact 236, switch 527, contact 528, conductor 564 (Figs. 4B and 4C), switch 529 (Fig. 4C), contact 530, conductor 565, switch 531 (Fig. 4E), contact 532, terminal 467 (see Fig. 5C), conductor 468, point 469 to the grid of the "10" tube 260, which fires and causes a cathode potential rise at point 470, through conductor 471, terminal 473 (see Fig. 4B), conductor 474, switch 331, contact 332, conductor 333 (Figs. 4C and 4D), raised switch 353 (Fig. 4D), contact 334, conductor 335 to common conductor 465 leading to the grid of the first tube in the units bank, as has been described. Thus, one digit tube has been fired in the tens bank representing the tens digit in the decimal number "16," which represents $2^4$ power being considered. The connections of the other terminals of the tens bank of the impulse producer will be given reference numbers so that they may be traced through the switches, as it is believed to be superfluous to describe each route after the principle of operation has been shown.

Referring to Fig. 5D, terminal 533 receives the firing impulse from common conductor 465 (see Fig. 4A), which impulse is carried over conductor 476 to point 477 leading to the grid of the "1" tube 266, firing it. Upon the rise in its cathode potential at point 478, the firing impulse is routed over conductor 420, terminal 480 (see Fig. 4A), conductor 482, switch 231, contact 235, conductor 483 to terminal 484 (see Fig. 5D), over conductor 486 to point 487 leading to the grid of the "2" tube 267, firing it. Upon the potential rise at point 488, the impulse is carried over conductor 489, terminal 491 (see Fig. 4A), conductor 492, switch 493, contact 441, conductor 442 (see Fig. 4B), switch 494, contact 443, conductor 444, switch 495, contact 445, conductor 496, terminal 497 (see Fig. 5D), conductor 489 to point 700 leading to the grid of the "3" tube, which, upon firing, causes a potential rise at point 701, which is conveyed directly to point 703 leading to the grid of the "4" tube 269, there being no "3" digit in the units order of the decimal numbers representing $2^0$ to $2^{11}$ inclusive. When tube 269 fires, a rise in potential occurs at point 704, which rise is conveyed by conductor 705, through terminal 507 (see Fig. 4C), conductor 508, switch 509, contact 534, conductor 535, switch 510, contact 580, conductor 581 (see Fig. 4D), switch 511, contact 512, switch 513 (see Fig. 5D), conductor 515, to point 516, firing the "5" tube 270, which causes a potential rise at point 716, which is conveyed directly to point 518 through resistor 517, there being no "5" digit in the units order of numbers represented by $2^0$ to $2^{11}$ inclusive. As the "6" tube fires, the rise in cathode potential at point 519 is conveyed over conductor 520, terminal 522 (see Fig. 4D), conductor 523, switch 352, contact 582, conductor 536 to common conductor 537 (see Figs. 4A, 4B, and 4C) to terminal 525 (see Fig. 5D), and through resistor 538 of 50,000 ohms to the negative 110-volt supply conductor, where the potential rise is dissipated.

Terminal 522 (Figs. 5D and 4D), connected to switch 352 (Fig. 4D), when in contact with the lower contact 540, conveys the rise in potential of the cathode of the "6" tube 271 (Fig. 5D) by means of conductor 541 (see also Fig. 4E), switch 542, contact 543, conductor 544, terminal 414 (see Fig. 5D), and conductor 545 to the grid of the "7" tube 272, firing it and the "8" tube 273 by direct connection between the cathode of the "7" tube and the grid of the "8" tube. The cathode of the "8" tube, being the last tube in the impulser series, has an extra resistor 546 of 50,000 ohms in its connection to the negative 110-volt conductor to provide proper cathode potential, which resistor in the cathode supply of the other tubes is found in connection with the grid supply of the next tube.

It will thus be seen that these switching circuits are so arranged that when any solenoid of the solenoids 200 to 211 inclusive (Figs. 4A to 4F) is operated, the decimal equivalent of the particular power of "2" represented by the operated solenoid is set up by denominations in the form of impulses equaling in number the digital values of the decimal notation of that number. Each of the produced impulses is amplified by means which will next be described in connection with one of the denominational units of the impulse producer to show by what method the produced impulses are transmitted to the decimal accumulator.

It will be apparent that, because the thousands, the hundreds, the tens, and the units impulses are produced in the order named, the highest denominational digit of the decimal number will be entered into the accumulator before the next lowest order, and so on; and that when the accumulator is discussed it further will become apparent that any denominational carry-over or transfer in the accumulator from a lower order to a higher denominational order will not interfere with the entry of any data in the said higher order, as it will have been already made.

*Amplifier for decimal impulses*

Each impulse output conductor for a bank of the impulse unit—for instance, conductor 875 (Fig. 5B), the output conductor for the hundreds bank—is coupled through a capacitor, like capacitor 500 of .00005 microfarad, through a point like point 501, and through a resistor, like resistor 502 of 100,000 ohms, to the grid of a gas triode 503, which grid is biased with a negative potential of approximately 37½ volts by being connected through point 501, resistor 1525 of 75,000 ohms, and resistor 1507 of 39,000 ohms to the negative 110-volt supply conductor 292, and being connected from point 526 through resistor 506 of 25,000 ohms to ground. The anode of amplifier tube 503 is given a positive potential of approximately 80 volts by being connected to supply terminal 570. The cathode of tube 503 is given a negative potential of approximately 27½ volts by being connected through point 504 and resistor 1508 of 75,000 ohms to the negative 110-volt supply conductor and by being connected through point 504 and resistor 505 of 25,000 ohms to ground. Under these circumstances, the bias on the control grid is sufficient to keep the tube from conducting except when a positive potential impulse is impressed on point 501 by reason of the discharge of one of the hundreds digit tubes, which renders the grid of tube 503 more positive and causes a discharge therein. The cathode of tube 503 receives a sharp rise in potential upon conduction commencing therein, which is of a magnitude of nearly 100 volts, which rise in potential is impressed upon terminal 606. Terminal 606 is connected to the input bank of the hundreds order of the decimal accumulator, to be described. The high initial current through tube 503, caused by the charging of capacitor 900 (Fig. 6B), to which the cathode of tube 503 is connected through terminal 606, is reduced abruptly as capacitor 900 becomes charged; and the dynamic coupling of the anode and cathode of the tube by both being electrostatically connected to ground, the cathode being coupled to ground through the capacitor 900 as mentioned, and the distributed inductance in the wiring, cause a momentary cessation of current between the anode and the cathode, during which the grid recovers control. Such self-extinguishing circuits are known in the electronic art.

Each of the denominational banks of the impulse producer has its own amplifying tube, as just described in connection with the hundreds bank of the impulse unit; however, such tube is not necessary for obtaining an accumulation of the impulses, but is merely used as an expedient whereby the produced impulses may be amplified for transmission to the accumulator.

The decimal accumulator

In Figs. 6A, 6B, 6C, and 6D are shown the units, tens, hundreds, and thousands banks, respectively, of the decimal notation accumulator. The input terminals from the impulse producer, which are numbered 601, 603, 605, and 607, (see also Figs. 5A, 5B, 5C, and 5D) represent the impulse conductors to the units bank, the tens bank, the hundreds bank, and the thousands bank, respectively.

Each of the accumulator banks representing the denominational orders of the decimal system has ten tubes, representing the digits of a denomination of the decimal notation; namely, 0, 1, 2, 3, 4, 5, 6, 7, 8, and 9. Each of the units, tens, and hundreds banks, in addition to the digit-representing tubes, has a denominational carry-over transfer tube T. The digit tubes in the bank are coupled in an endless operating chain whereby but one tube is conducting at any one time, and whereby an impulse causes a conducting tube to be extinguished and the next tube in the sequence to become conducting, thereby causing a step of operation in the endless chain and indicating an entry of a unit of data. Just as in any numerical accumulator, upon completion of the entry of a full number of impulses into a denomination, the accumulation commences again at zero, and a transfer of one unit is made to the next higher denominational order, this being called a "denominational transfer of carry-over data." Special means is provided whereby, when the tube representing the highest number in the denomination is changed from a conducting condition to a non-conducting condition upon the receipt of a potential impulse, the "transfer tube" will be rendered conductive temporarily and cause an impulse to be produced and conveyed to the next higher bank of the accumulator. Such a transfer tube is not shown for the thousands order, as there is no higher denomination to transfer to, the capacity of the accumulator in the disclosed embodiment of the invention being 9999.

The tubes are of the gaseous triode type heretofore described as the tubes used in the impulse-producing unit. Referring to Fig. 6C, the hundreds bank, as an example, the anodes are supplied by a conductor 611 given a positive potential through the terminal 609, resistor 612 of 200 ohms, point 613, point 614, and resistor 615 of 10,000 ohms. At point 614, the anode supply conductor is connected through resistor 616 of 10,000 ohms, point 617, point 618, and resistor 619 of 10,000 ohms to ground, making a total of about 118 volts anode potential for the digit-representing tubes. It will be noted that the anode of the transfer tube is connected to point 614 through resistor 616 of 10,000 ohms, making its anode potential about 60 volts positive. Each of the cathodes is connected to a point like point 610 (representing the cathode of the "800" tube), and each point like point 610 is connected on one side to ground through a resistor like resistor 620 of 25,000 ohms, and on the other side to the negative 190-volt conductor 621 through a resistor like resistor 622 of 60,000 ohms and resistor 623 of 50,000 ohms, which gives each cathode an effective potential of approximately 35 volts negative. Each cathode is connected through a resistor like resistor 622, already mentioned, a point like point 624, a resistor like resistor 625 of 100,000 ohms, a point like point 626, a resistor like resistor 627 of 50,000 ohms, to the grid of the tube next higher in the denominational sequential order. Each grid is connected at a point like point 626 through resistor 625, point 624, and a resistor like resistor 623, to the negative potential supply conductor 621, giving a potential bias to the grid of the tube representing "900," of approximately 120 volts negative. Each cathode is connected from a point like point 628, through a coupling capacitor, like capacitor 629 of .002 microfarad, to a common conductor 630, which conductor follows the potential changes of the cathodes coupled thereto and consequently is given a positive potential impulse upon any tube of the denomination firing and becoming conducting, which impulse is impressed through all the other capacitors of the digit-representing tubes, causing the cathode of any then conducting tube to become extinguished, as any conducting tube has an internal potential difference between the electrodes of approximately only 15 volts, and the potential positive surge impressed upon conductor 630 is of the order of several times that, thus bringing the cathode of any conducting tube to a potential where it is more positive than the anode, thus extinguishing the tube and allowing the grid to regain control.

As a tube is conducting, its cathode is raised in potential, thus raising the potential of points like point 628, point 624, point 626, and the grid of the succeeding tube to a point just negative enough in potential to the cathode to prevent conduction in the "900" tube. In this manner, the tube succeeding next in the series to a conducting tube has its grid primed, and, if an impulse of positive potential is impressed on terminal 606 and consequently impressed through all the capacitors corresponding to capacitor 632 of .00005 microfarad, the grids of all the tubes will be made more positive, but the controlling bias on the non-conducting tubes that are not next adjacent in the sequence in the higher direction from the conducting tube will not be made more positive than the critical point so as to cause the associated tube to fire, whereas the primed grid will be made more positive than the critical point and such tube will fire, extinguishing the last conducting tube, thus causing each empulse impressed on terminal 606 to cause a step of operation in the ring of digit tubes. It is arranged that, when the "900" tube is conducting, not only will it prime the zero tube by way of point 633, resistor 634, point 635, conductor 636, resistor 637, point 638, resistor 639 and onto the grid of the zero tube, but it will also prime the grid of the transfer tube T by way of point 633, resistor 641, of 120,000 ohms, point 642, resistor 643 of 100,000 ohms, point 644, and resistor 645 of 50,000 ohms and onto the grid of the said transfer tube, causing it to fire with the zero tube on the next commonly received impulse. The transfer tube is arranged to be self-extinguishing in the manner heretofore mentioned in connection with the amplifier tubes, and, upon conducting, it extinguishes itself automatically by reason of its anode-cathode coupling to ground through capacitors 664 and 665, respectively.

The potential rise of point 670 is conveyed through point 671 and conductor 672, terminal 601 (see Fig. 6D) to the thousands input conductor, causing an entry of one unit in the thousands bank.

As the input impulse conductor to the units bank of the accumulator (Fig. 6A) is not coupled to ground through a capacitor by being connected to the cathode of the transfer tube of a preceding bank, such capacitance is provided by capacitor 1601 of the same value as the cathode capacitors of the transfer tubes, thus balancing the units input circuit.

Reference is made to the application for United States Letters Patent of Robert E. Mumma, Serial No. 396,505, filed June 4, 1941, for a complete description of the structure and operation of the accumulator just described.

Capacitor 675 (Fig. 6C) of .1 microfarad, in conjunction with resistor 612 of 300 ohms, prevents too sudden an application of anode supply potential to the anode supply circuit.

The structure and means described for receiving impulses at high speed by means of a counter operating on the binary system of numerical notation and composed of pairs of trigger connected tubes, and for translating the data from the binary system to the decimal system of numerical notation, can be indefinitely extended, as will be apparent from what has been described. The invention is not to be deemed limited by the type of tubes used, by any of the circuit element values, by the type of relays or means for communicating impulses from one unit of the combination to another unit of the combination, or by the type of accumulator used, as the principal feature of novelty of the invention lies in the reception of impulses at high speed which are stored pending the translation and accumulation of the data into the decimal system of numerical notation.

The principle of the invention, moreover, is not restricted to electronic means for accumulating in the binary system and translating to the decimal system of numerical notation, as either one element or the other element—that is, the receiving binary storage means or the accumulating decimal means—may be of an electronic nature or not, it being conceivable that the impulse producer, for instance, might operate a mechanical or semi-mechanical storage device or accumulator. On the other hand, the invention is capable of reading previously stored data from a binary accumulator of mechanical nature and translating the same electronically into an electronic accumulator.

While the mechanism and circuits shown and described herein are admirably adapted to fulfill the objects primarily stated, it is to be understood that it is not intended to confine the invention to the one form or embodiment disclosed, for it is susceptible of embodiment in various forms all coming within the scope of the claims which follow.

What is claimed is:

1. In combination, an accumulator of numerical data including denominational rings of electron tubes, the rings being coupled to be operated sequentially, one at a time, and the tubes in a ring being coupled so as to be operative one at a time in sequence, in response to each of electric impulses received commonly by the tubes representing a denomination; an electric impulse producer consisting of denominational groups of electron tubes, the tubes of each group operable sequentially one at a time for a selected number of operations so as to produce a certain number of impulses for the associated denomination of the accumulator; a second electronic counter of numerical data consisting of a series of denominational groups of electron tubes, the denominations being operable sequentially, the member tubes of the group comprising the denomination being operable sequentially in response to electric impulses entered into the lowest denominational order of the series; means to scan the denominations in said second counter to determine whether or not there is data registered in any of the scanned denominations; a member associated with each denomination of the second counter and operated when the scanning device determines that there is data in said denomination; and a series of switches for each operated member, there being in each group of switches one switch for each order of the impulse producer, said switches controlling the extent to which the tubes in the corresponding denomination of the impulse producer shall be operated, and said number of steps of operation in each denomination of the impulse producer representing, in the numerical notation of the first counter, the value represented by the second counter, thereby translating data represented in one system of denominational numerical notation into another system of denominational numerical notation.

2. In combination, a plurality of pairs of electron tubes, the tubes of a pair being connected in a trigger circuit so that one tube or the other tube of a trigger pair is conducting at any one time and the other tube of the trigger pair is perforce non-conducting at the same time, forming a denomination; means connecting the trigger pairs in a series operative chain so that two changes in the mode of operation of one trigger pair will cause a change in the mode of operation of the trigger pair next in series, said series of trigger pairs constituting an electronic counter based on the binary system of numerical notation, wherein the condition of conduction of one tube of the pair indicates a registration of data in that denomination; means to scan the anodes of one of the tubes of each pair to determine which of the scanned tubes is in a conducting condition; a switching unit for each denominational pair of trigger-connected tubes, the associated switching unit being operated by the scanning means if said pair is in the mode of operation indicating a registration of data; an electronic impulse producer divided into sections representing the denominational orders in the decimal system of numerical notation; means operated by the switches for controlling the decimal impulse producer to produce impulses in the denominational orders of the decimal system so as to translate the registered data into the decimal notation; and an accumulator of numerical data operated by electric impulses, said accumulator having sections, each of which represents a denomination of the decimal system and which is independently actuated by the corresponding section of the impulse producer.

3. In combination, a producer of electric impulses including a plurality of series of digit-representing electron tubes, the operation of a tube producing an impulse, each series representing a denominational order of a denominational numerical notation other than the binary numerical notation; and a plurality of multiple switches, each multiple switch differentially controlling a selected one or more of the series of tubes in the impulse producer so as to determine how many tubes in such series shall be operative, a multiple switch representing a number which is a power of two and controlling the impulse producer so as to translate said number into denominational impulses of the particular numerical notation represented by said impulse producer.

4. An electronic impulse producer consisting of a plurality of series of electron tubes connected in an operative series, each series representing a denomination of a numerical notation, and each tube in the series representing a digit of such denomination it represents; means to produce impulses in each denominational order by causing conduction to occur sequentially in the number of tubes in that denominational order which will represent the digit to be expressed in that order; and a plurality of switches, each having connections whereby to control the series connections in certain denominational orders of the impulse producer to cause said impulse producer to produce impulses in one or more denominations representing a multi-denominational number in the particular notational system in use.

5. A plurality of banks of impulse-producing electron tubes, the tubes in each bank being arranged in series and operable in succession upon an initiation of an operation of the first tube by means of couplings between each two adjacent tubes of the sequence; a plurality of banks of switches, there being one switch in each bank of switches for each bank of tubes; and a common operating means for each bank of switches, each of said switches operating to break the coupling between two tubes in an associated bank and switch the operation to the beginning of the next adjacent bank so that the banks are operated in sequence and a predetermined number of tubes in each bank, as controlled by a bank of switches, are operated in sequence.

6. A plurality of electronic devices arranged in banks, each bank representing a denomination of a numerical system and each device in a bank representing a digit in a denomination of that system, the devices in each bank being coupled one to another in an endless chain operating sequence whereby if an operation is initiated at one end of the chain each device will be operated in succession to the other end of the chain; means to initiate the operation in one of the banks; means for selecting a number of devices to be operated in each bank by breaking the coupling at a point and switching the operative coupling to another bank by means of a switch so that at the end of the operative sequence of the selected number of devices in one bank, the next bank will operate in sequence; and means connecting certain members of the switching means in gangs for operation together, there being in one gang one switch associated with each bank of devices so that a predetermined number of devices in each of the banks shall be selected with one operation of each gang of switches.

7. In combination, a plurality of banks of electron tubes, the tubes in a bank being coupled for sequential operation, one at a time in sequence; a conductor for each bank, which receives a potential impulse for each tube operated in the bank; switching means for determining how many tubes in a given bank are to operate; and a plurality of members, each of said members representing a single denominational number or a multi-denominational number, and each of said members controlling the switching means so that the impulse producer will produce a number of impulses in each denominational conductor equal in value to the digits of the number represented by the member.

8. In combination, a plurality of pairs of high-vacuum electron tubes, the members of a pair being connected in a trigger circuit, whereby one tube or the other may be conducting at any one time and whereby an electric impulse impressed commonly upon the members of a pair will change the mode of operation as to which one of the pair is conducting; means connecting the pairs of trigger tubes in a sequence, so that an electric impulse is given to the trigger pair next higher in sequence after the pair in question has changed its mode of operation twice in response to electric impulses, thereby creating a binary accumulator of numerical data received through the first pair of the sequence by means of electric impulses impressed thereon at intervals of time; a scanning means for the binary accumulator including an electric contact for each trigger pair, which contact is energized by the condition of conduction of a designated one of each trigger pair when that designated tube is in a conducting condition; switches operated by each of said contacts so that when a certain trigger pair is in a certain mode of operation the corresponding switches will be operated; an electric impulse producer including elements corresponding to denominations of the decimal system of numerical notation; and connections between the switches and the impulse producer for controlling the impulse producer according to the state of conduction in various denominations of the binary accumulator, so as to change the accumulated data from a binary denominational notation to a decimal denominational notation.

9. In combination, a plurality of trigger-connected pairs of high-vacuum electron tubes; means for impressing operating electric impulses on each of said pairs, said pairs being connected in a series whereby two changes in the mode of operation of the pair at the first of the series creates an impulse to operate the pair next in the series once, thereby providing a counter for electrical impulses on a scale of two; means to render designated ones of all the pairs of tubes conducting, the other tube of all the pairs perforce being in a non-conducting condition; means to cause a potential drop in the anode of a tube as it becomes conducting; means for scanning all the originally non-conducting tubes to see if any has become conducting; a member associated with each trigger pair and operated by the drop in potential of the mentioned anode; a series of contacts closed by each member when operated; a means for producing a differential number of electric impulses in a plurality of denominations based on the decimal system of numerical notation, said denominations each consisting of a number of digit-representing tubes which may be caused to become conducting one after another to create electric impulses; and means operated by the closing of the contacts representing a member for selecting a certain number of tubes in each denomination of the impulse producer to become conducting, said number of tubes in each decimal order of the impulse-producing unit being the same as necessary to express the number represented by the denominational order of the binary system which said switch represents.

JOSEPH R. DESCH.
LAWRENCE D. KILHEFFER.